United States Patent
McGrath

(10) Patent No.: US 6,901,505 B2
(45) Date of Patent: May 31, 2005

(54) INSTRUCTION CAUSING SWAP OF BASE ADDRESS FROM SEGMENT REGISTER WITH ADDRESS FROM ANOTHER REGISTER

(75) Inventor: Kevin J. McGrath, Los Gatos, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 719 days.

(21) Appl. No.: 09/927,054

(22) Filed: Aug. 9, 2001

(65) Prior Publication Data

US 2003/0033507 A1 Feb. 13, 2003

(51) Int. Cl.[7] ............................................. G06F 9/315
(52) U.S. Cl. ..................................................... 712/225
(58) Field of Search ........................... 712/225, 41–43, 712/228, 229

(56) References Cited

U.S. PATENT DOCUMENTS

| | | |
|---|---|---|
| 5,418,956 A | 5/1995 | Willman |
| 5,684,993 A | 11/1997 | Willman |
| 6,792,499 B1 * | 9/2004 | Eldredge ........................ 711/5 |

OTHER PUBLICATIONS

Uffenbeck, John, Microcomputers and Microprocessors, The 8080, 8085, and Z-80 Programming, Interfacing, and Troubleshooting, Prentice–Hall, Inc., 1985, pp. 266–267.*
Hubicka, Jan, "Add swapgs/fix syscall in binutils", email to "patches@x86–64.org" email list, Dec. 18, 2000.*
Keil, Karsten, "fix swapgs", email to "patches@x86–64.org" email list, Dec. 31, 2000.*
Sites, Richard L., et al., "Alpha Architecture Reference Manual, Third Edition", Digital Press, 1998, pp. preface, 1–2, 2–4, 5–12 t 5–13, and 5–17.*
Motorola, "MC68030 Enhance 32–bit Microprocessor User's Manual, Second Edition", Prentice Hall, 1989, pp. 1–2, 1–4, 2–10, 2 20 to 2–23, 3–101, 3–107, 3–186, and 4–2.*
The Technology Behind Crusoe™ Processors, Low–Power x86–Compatible Processors Implemented with Code Morphing™ Software, Transmeta Corporation, Jan. 2000, pp. 1–18.
Alpha Learns to Do Windows; Digital's FX!32 is The Key To Running Win32 Software on Alpha/Windows NT., Selinda Chiquoine, BYTE, Aug. 4, 1998, 4 pages.
Awards Stack Up for DIGITAL FX!32 Windows Compatibility Software for ALPHA, DIGITAL Press Releases, Dec. 11, 1997, 7 pages.

(Continued)

Primary Examiner—Richard L. Ellis
(74) Attorney, Agent, or Firm—Lawrence J. Merkel; Meyertons, Hood, Kivlin, Kowert & Goetzel, P.C.

(57) ABSTRACT

A processor is described which executes an instruction defined to swap the contents of at least one special purpose register (e.g. an MSR or a segment register) and another register. In some implementations, both of the registers are special purpose registers (e.g. a segment register and an MSR). The instruction may be used to provide a pointer to an operating system data structure in a register useable for address generation, and to preserve the content of that register in the other register involved in the swap. For example, in the segment register/MSR embodiment, the MSR may store the pointer and the segment register base address may be used in address generation operations.

34 Claims, 15 Drawing Sheets

OTHER PUBLICATIONS

*DIGITAL FX!32; White Paper: How DIGITAL FX!32 Works*, DIGITAL Semiconductor, Jan. 26, 1998, 4 pages.

*An Alpha in PC Clothing; Digital Equipment's New x86 Emulator Technology Makes An Alpha System a Fast x86 Clone*, Tom Thompson, BYTE, Aug. 4, 1998, 7 pages.

*AMD 64–Bit Technology; The AMD x86 Architecture Programmers Overview*, AMD, Publication #24108 Rev: A, Aug. 2000, pp. 1–106.

*AMD 64–Bit Technology; The AMD x86–64 Architecture Programmers Overview*, AMD, Publication #24108 Rev: C, Jan. 2001, pp. 1–128.

*Alpha Architecture Reference Manual*, Third Edition, Digital Press, 1998 Digital Equipment Corporation, pp. 5–14 to 5–15, 5–18 to 5–19, 5–30 to 5–35.

*32–Bit Microprocessor User's Manual*, MC68020, Third Edition, Motorola, 1989, pp. 3–105 and 3–184.

*Intel Architecture Software Developer's Manual*, vol. 1: Basic Architecture, 1997, pp. 6–17 to 6–19.

Intel, "Intel Architecture Software Developer's Manual, vol. 2: Instruction Set Reference," 1997, pp. 3–29, 3–66 to 3–69, 3–196 to 3–197, 3–460 to 3–463.

AMD, "SYSCALL and SYSRET Instruction Specification", Application Note, 1998, pp. 1–10.

Intel, "Intel Architecture Software Developer's Manual, vol. 2: Instruction Set Reference," 1997, pp. 3–256 to 3–258, 3–286 to 3–290, 3–350 to 3–353, 3–385 to 3–387.

*Intel Architecture Software Developer's Manual*, vol. 1: Basic Architecture, 1997, pp. 3–38 to 3–39.

*Addendum–Intel Architecture Software Developer's Manual*, vol. 2: Instruction Set Reference, 1996/1997, Chapter 3, pp. 3–1 to 3–15.

*Pentium Pro Family Developer's Manual*, vol. 3: Operating System Writer's Guide, 1996, pp. 2–1 to 2–21, 3–1 to 3–33, 4–1 to 4–29.

\* cited by examiner

| LMA | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

INSTRUCTION CAUSING SWAP OF BASE ADDRESS FROM SEGMENT REGISTER WITH ADDRESS FROM ANOTHER REGISTER

BACKGROUND OF THE INVENTION

1. Field of the Invention

This invention is related to the field of processors and, more particularly, instruction execution in processors.

2. Description of the Related Art

Generally, computer systems execute software including application programs and an operating system. The application programs generally provide functionality to the user of the computer system. For example, application programs may include word processing programs, spreadsheets, financial software, circuit simulators, compilers, computer aided design (CAD) programs, circuit synthesis programs, desktop publishing programs, graphics design programs, internet browsers, email programs, etc. Numerous other examples of application programs may exist. The operating system, on the other hand, generally provides the low level interface to the computer hardware, insulating the application program from such details. Furthermore, modern operating systems provide for two or more application programs (or processes within the application programs, if the application programs are multi-threaded) to be active in the system concurrently. In such systems, the operating system manages allocation of computer system resources (e.g. allocating processor execution time to the active threads, as well as allocating memory and peripherals that may be included in the system) to the various active processes. Furthermore, the operating system may provide additional services that may be useful for a variety of application programs.

Since the application programs generally rely on the operating system for access to system resources and for other services, the application programs may include calls to various operating system routines to provide access to the resources or to provide a given service. Generally, the calling mechanism (which may include hardware features in the processor or processors in the computer system, software calling conventions, or a combination of both) includes an indication of the operating system routine being called (e.g. a variable indicating the requested service, an address of the operating system routine being called, etc.). Additionally, the calling mechanism provides some means for ensuring that the application program's data is preserved (including data stored in registers within the processor) and for establishing access to the operating system's data structures in the processor.

While much of the calling mechanism may be handled via software calling conventions (e.g. providing operands for the operating system routine in certain predefined registers or memory locations prior to executing a branch to the operating system routine, saving application registers by the application program prior to the call or after the call, etc.), establishing access to the operating system's data structures may be more complicated. Generally, the mechanism must ensure that the application program code does not get access to the operating system's privileged data structures. Additionally, the mechanism must supply, at some point, a pointer to the operating system's data structures. The mechanism for establishing access to the operating system's data structures may be complex and may be time consuming.

For example, the x86 architecture specifies a mechanism for transferring control between privilege levels through the call/interrupt/trap gate mechanism (below referred to more succinctly as the gate mechanism). An application program is expected to execute at a low privilege level and the operating system, or a portion thereof, is expected to execute at a high privilege level. The gate mechanism uses gates in the segment tables to control entry into a higher privilege level, with a variety of protection checks being performed during the entry. Additionally, the gate mechanism provides for stack switching, saving the stack pointer for the application program and establishing a stack pointer (in the stack pointer register, or ESP) to a stack used by the higher privileged code (e.g. the operating system routine). Using this mechanism, a pointer to the operating system's stack may be established. The stack may be used to store pointers to other operating system data structures, thus allowing the operating system routine to access any desired data structures. The gate mechanism is relatively slow, typically requiring on the order of hundreds of processor clocks to operate.

An additional mechanism for performing operating system calls in the x86 architecture are the Syscall and Sysret instructions defined by Advanced Micro Devices, Inc. These instructions provide a rapid transfer to the operating system routine. However, these instructions do not provide a mechanism for providing access to operating system data structures.

SUMMARY OF THE INVENTION

A processor is described which executes an instruction defined to swap the contents of at least one special purpose register (e.g. an MSR or a segment register) and another register. In some implementations, both of the registers are special purpose registers (e.g. a segment register and an MSR). The instruction may be used to provide a pointer to an operating system data structure in a register useable for address generation, and to preserve the content of that register in the other register involved in the swap. For example, in the segment register/MSR embodiment, the MSR may store the pointer and the segment register base address may be used in address generation operations. By executing the instruction, the segment base address and the contents of the MSR are swapped, and the segment base address may thus be the pointer to the operating system data structure. The segment base address may then be used in address calculations. The instruction may be used in combination with the Syscall/Sysret instructions to provide a low latency operating system call.

Broadly speaking, a processor is contemplated, comprising a segment register having a portion for storing a segment base address; a register for storing an address; and an execution core coupled to the segment register and the register. The execution core is configured, in response to a first instruction, to swap the segment base address in the segment register and the address in the register.

Additionally, an apparatus is contemplated, comprising: a first storage location corresponding to a segment register, the first storage location having a portion for storing a segment base address; a second storage location corresponding to a register, the second storage location for storing an address; and a processor coupled to the first storage location and to the second storage location. The processor is configured, in response to a first instruction, to swap the segment base address in the first storage location and the and the address in the second storage location.

Moreover, a carrier medium is contemplated. The carrier medium holds an instruction which, when executed, causes a segment base address from a segment register and an address stored in a different register to be swapped. Another carrier medium is also contemplated, holding an operating system routine including a first instruction which, when executed, causes a segment base address from a segment register and a base address stored in a register to be swapped, wherein the base address stored in the register is a pointer to one or more operating system data structures.

Also, a processor is contemplated. The processor comprises a special purpose register for storing a first address; a register for storing a second address; and an execution core coupled to the special purpose register and the register. The execution core is configured, in response to a first instruction, to swap the first address in the special purpose register and the second address in the register.

BRIEF DESCRIPTION OF THE DRAWINGS

The following detailed description makes reference to the accompanying drawings, which are now briefly described.

FIG. 4 is a table illustrating one embodiment of operating modes as a function of segment descriptor and control register values.

Figure 1:
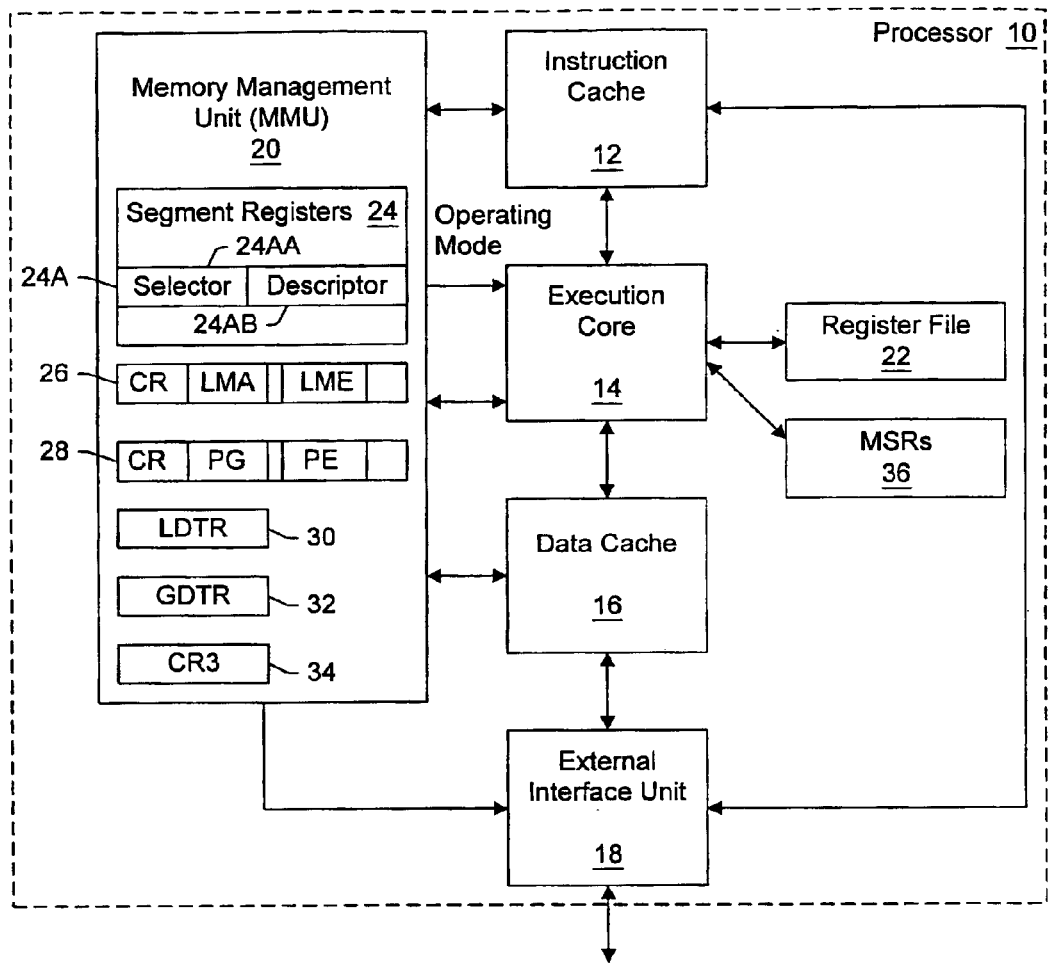
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, a register file 22, and a set of model specific registers (MSRs) 36. In the illustrated embodiment, MMU 20 includes a set of segment registers 24, a first control register 26, a second control register 28, a local descriptor table register (IDTR) 30, a global descriptor table register (GDTR) 32, and a page table base address register (CR3) 34. Instruction cache 12 is coupled to external interface unit 18, execution core 14, and MMU 20. Execution core 14 is further coupled to MMU 20, register file 22, MSRs 36, and data cache 16. Data cache 16 is further coupled to MMU 20 and external interface unit 18. External interface unit 18 is further coupled to MMU 20 and to an external interface.

Processor 10 may employ a processor architecture compatible with the x86 architecture (also known as the IA-32 architecture) and including additional architectural features to support 64 bit processing. More particularly, the processor architecture employed by processor 10 may define a mode, referred to below as "long mode". Long mode is a mode in which 64 bit processing is selectable as an operating mode, as well as 32 bit or 16 bit processing as specified in the x86 architecture. More particularly, long mode may provide for an operating mode in which virtual addresses may be greater than 32 bits in size.

Processor 10 may implement a mechanism allowing for orderly transition to and from long mode, even though multiple registers may be changed to perform the transition. Particularly, processor 10 may employ a long mode active (LMA) indication in a control register (e.g. control register 26 in the present embodiment, although the LMA indication may be stored in any control register, including control registers not storing the LME indication). The processor 10 may use the LMA indication as the indication of whether or not long mode is active (i.e. whether or not the processor is operating in long mode). However, the LMA indication may not be modified directly via an instruction. Instead, an instruction is used to change the state of the LME indication to indicate whether or not long mode is desired. Long mode may be activated (as indicated by the LMA indication) via the combination of enabling paging (as indicated by the PG indication in control register 28 and described in more detail below) and the LME indication indicating that long mode is desired. Viewed in another way, the LME indication may be used to enable the transition to long mode. The LMA indication may indicate whether or not the transition has successfully occurred, and thus indicates whether processor 10 is operating according to the long mode definition or processor 10 is operating according to the legacy definition of the x86 processor architecture.

Processor 10 is configured to establish an operating mode in response to information stored in a code segment descriptor corresponding to the currently executing code and further in response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands. As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define a segment of memory and to further define access control and status for the segment. A "segment descriptor table" is a table in memory storing segment descriptors. Since there is more than one operating mode, the operating mode in effect at any given time may be described as being the "active" operating mode.

In the illustrated embodiment, MMU 20 generates an operating mode and conveys the operating mode to execution core 14. Execution core 14 executes instructions using the operating mode. More particularly, execution core 14 fetches operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g. execution core 14), and the operating mode may be determined from the local shadow copies.

As mentioned above, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores an enable indication (LME) which is used to enable transition to long mode and the LMA indication indicating whether or not long mode is active. In long mode, an operating mode in which the default address size is greater than 32 bits ("32/64 mode") as well as certain compatibility modes for the 32 bit and 16 bit operating modes may be available using the segment descriptor indications. The default operand size may be 32 bits in 32/64 mode, but instructions may override the default 32 bit operand size with a 64 bit operand size when desired. If the LME indication is in an enabled state, then long mode may be activated. If the LME indication is in a disabled state, then long mode may not be activated. In one embodiment, the default address size in 32/64 mode may be implementation-dependent but may be any value up to and including 64 bits. Furthermore, the size of the virtual address may differ in a given implementation from the size of the physical address in that implementation.

It is noted that various indications are described herein (e.g. LMA, LME, etc.). Generally, an indication is a value which may be placed into two or more states. Each state may be assigned a meaning. Some of the indications described herein (including some enable indications) may be described as bits. The bit being set may be one state (e.g. the enabled state for enable indications) and the bit being clear may be the other state (e.g. the disabled state for enable indications). However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above. Similarly, the LMA indication may be referred to as the LMA bit, with the set state indicating that long mode is active and the clear state indicating that long mode is inactive. However, other encodings of the LMA indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector locates the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and an index within the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change.

In one embodiment, only the CS segment register is used in 32/64 mode. The data segment registers are ignored from the standpoint of providing segmentation information. In another embodiment, some of the data segment registers may be used to supply base addresses (the segment base portion of the descriptor field) for certain addressing calculations. For example, the FS and GS registers may be used in this fashion, while other segment features may be disabled for these segment registers and the other data segment registers may be ignored. In 16 and 32 bit modes, the code segment and data segments may be active. Furthermore, a second enable indication (PE) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above. Generally, a "protected mode" is a mode in which various hardware and/or software mechanisms are employed to provide controlled access to memory.

Control register 28 is further illustrated in FIG. 1 as storing a paging enable indication (PG). The PG indication may indicate whether or not paging is enabled. As mentioned above, the LMA bit is set once paging is enabled and the LME bit is set. As used herein, the term "paging" or "paging address translation" refers to the translation of virtual addresses to physical addresses using mappings stored in a page table structure indicated by the page table base address register 34. A given page mapping maps any virtual address having the same virtual page number to a corresponding physical address in a page of physical memory. The page table is a predefined table of entries stored in memory. Each of the entries store information used to map virtual addresses to physical addresses.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode. Generally, the control registers are each addressable by one or more instructions defined in the processor architecture, so that the registers may be changed as desired.

Instruction cache 12 is a high speed cache memory for storing instruction bytes. Execution core 14 fetches instructions from instruction cache 12 for execution. Instruction cache 12 may employ any cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may also access or update MSRs 36 in response to read MSR (RDMSR) and write MSR (WRMSR) instructions, respectively.

Execution core 14 may employ any construction. For example, execution core 14 may be a superpipelined core, a superscalar core, or a combination thereof. Execution core 14 may employ out of order speculative execution or in order execution, according to design choice. Execution core 14 may include microcoding for one or more instructions or exception situations, in combination with any of the above constructions.

Register file 22 may include 64 bit registers which may be accessed as 64 bit , 32 bit, 16 bit , or 8 bit registers as indicated by the operating mode of processor 10 and any overrides for a particular instruction. The registers included in register file 22 may include the RAX, RBX, RCX, RDX, RDI, RSI, RSP, and RBP registers (which may be 64 bit versions of the EAX, EBX, ECX, EDX, EDI, ESI, ESP, and EBP registers defined in the x86 processor architecture, respectively). Additionally, in one embodiment, register file 22 may include additional registers addressed using a register extension (REX) prefix byte. Register file 22 may further include the RIP register, which may be a 64 bit version of the EIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

While the processor architecture described herein may be compatible with the x86 processor architecture for 16 and 32 bit modes, in one embodiment, other embodiments may employ any 16 and 32 bit modes. The other embodiments may or may not be compatible with the x86 processor architecture or any other processor architecture. It is further noted that, while a specific set of information is described herein as being used to generate the operating mode, any combination of indications and/or information from memory data structures such as segment descriptor tables and page tables may be used to generate the operating mode in various embodiments.

Figure 2:
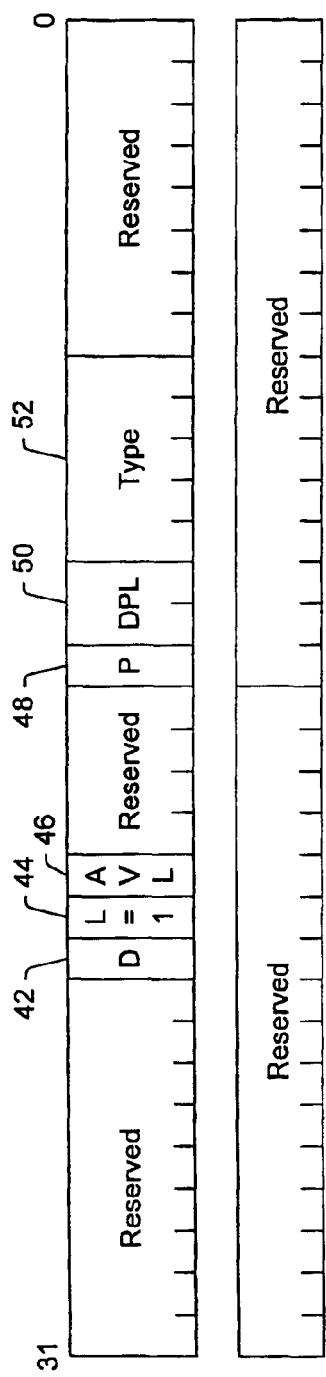
FIG. 2 is a block diagram of one embodiment of a segment descriptor for 32/64 mode.
Figure 2:

Turning now to FIG. 2, a block diagram of one embodiment of a code segment descriptor 40 for 32/64 mode is shown. Other embodiments are possible and contemplated. In the embodiment of FIG. 2, code segment descriptor 40 comprises 8 bytes with the most significant 4 bytes illustrated above the least significant 4 bytes. The most significant four bytes are stored at a numerically larger address than the least significant four bytes. The most significant bit of each group of four bytes is illustrated as bit 31 in FIG. 2 (and FIG. 3 below), and the least significant bit is illustrated as bit 0. Short vertical lines within the four bytes delimit each bit, and the long vertical lines delimit a bit but also delimit a field (both in FIG. 2 and in FIG. 3).

Unlike the 32 bit and 16 bit code segment descriptors illustrated in FIG. 3 below, code segment descriptor 40 does not include a base address or limit. Processor 10 employs a flat virtual address space for 32/64 mode (rather than the segmented linear address space employed in 32 bit and 16 bit modes). Accordingly, the portions of code segment descriptor 40 which would otherwise store the base address and limit are reserved in segment descriptor 40. It is noted that a virtual address provided through segmentation may also be referred to herein as a "linear address". The term "virtual address" encompasses any address which is translated through a translation mechanism to a physical address actually used to address memory, including linear addresses and other virtual addresses generated in non-segmented architectures.

Segment descriptor 40 includes a D bit 42, an L bit 44 (set to one for a 32/64 mode code segment), an available bit (AVL) 46, a present (P) bit 48, a descriptor privilege level (DPL) 50, and a type field 52. D bit 42 and L bit 44 are used to determine the operating mode of processor 10, as illustrated in FIG. 4 below. AVL bit 46 is available for use by system software (e.g. the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g. from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g. configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit two bits of type field 52 may be set (the most significant bit distinguishing a code or data segment from a system segment, and the second most significant bit distinguishing a code segment from a data segment), and the remaining bits may encode additional segment type information (e.g. execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Figure 3:
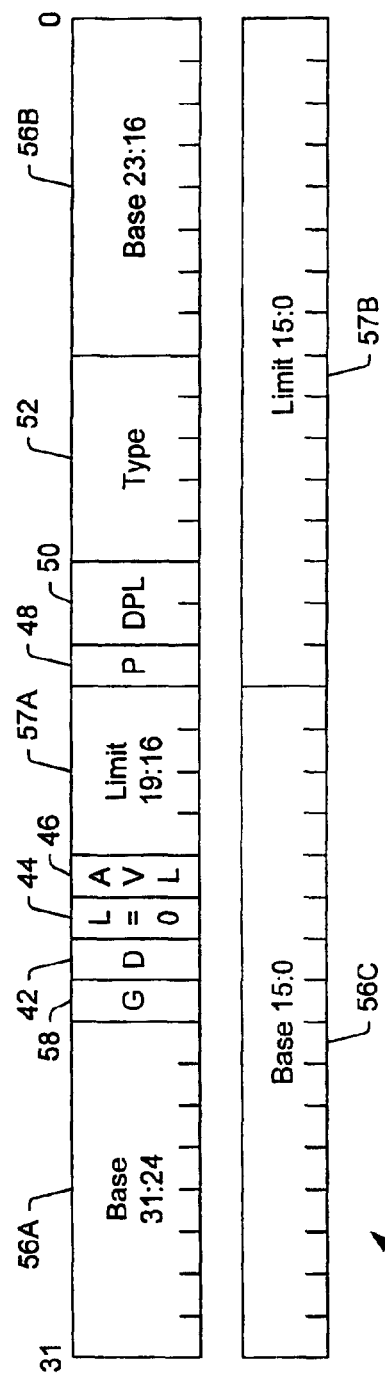
FIG. 3 is a block diagram of one embodiment of a segment descriptor for compatibility mode.
Figure 3:

Turning now to FIG. 3, a block diagram of one embodiment of a code segment descriptor 54 for 32 and 16 bit compatibility mode is shown. Other embodiments are possible and contemplated. As with the embodiment of FIG. 2, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address which is added to the logical fetch address (stored in the RIP register) to form the linear address of an instruction, which may then optionally be translated to a physical address through a paging translation mechanism. The limit field stores a segment limit which defines the size of the segment. Attempts to access a byte at a logical address greater than the segment limit are disallowed and cause an exception. G bit 58 determines the scaling of the segment limit field. If G bit 58 is set the limit is scaled to 4K byte pages (e.g. 12 least significant zeros are appended to the limit in the limit field). If G bit 58 is clear, the limit is used as is.

It is noted that code segment descriptors for 32 and 16 bit modes when long mode is not active may be similar to code segment descriptor 54, except the L bit is reserved and defined to be zero. It is further noted that, in 32 and 16 bit modes (both compatibility mode with the LMA bit set and modes with the LMA bit clear) according to one embodiment, data segments are used as well. Data segment descriptors may be similar to code segment descriptor 54, except that the D bit 42 is defined to indicate the upper bound of the segment or to define the default stack size (for stack segments).

Turning next to FIG. 4, a table 70 is shown illustrating the states of the LMA bit, the L bit in the code segment descriptor, and the D bit in the code segment descriptor and the corresponding operating mode of processor 10 according to one embodiment of processor 10. Other embodiments are possible and contemplated. As table 70 illustrates, if the LMA bit is clear, then the L bit is reserved (and defined to be zero). However, processor 10 may treat the L bit as a don't care if the LMA bit is clear. Thus, the x86 compatible 16 bit and 32 bit modes may be provided by processor 10 if the LMA bit is clear. If the LMA bit is set and the L bit in the code segment is clear, then a compatibility operating mode is established by processor 10 and the D bit selects 16 bit or 32 bit mode. If the LMA bit and the L bit are set and the D bit is clear, 32/64 mode is selected for processor 10. Finally, the mode which would be selected if the LMA, L and D bits are all set is reserved.

As mentioned above, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64 bit operand size may actually reduce the execution performance achieved by the program (i.e. increased execution time). In part, this reduction may be attributable to the doubling in size in memory of the data structures used by the program when 64 bit values are stored. If 32 bits is sufficient, these data structures would store 32 bit values, Thus, the number of bytes accessed when the data structure is accessed increases if 64 bit values are used where 32 bit values would be sufficient, and the increased memory bandwidth (and increased cache space occupied by each value) may cause increased execution time. Accordingly, 32 bits is selected as the default operand size and the default may be overridden via the encoding of a particular instruction. However, other embodiments may define the default operand size to be 64 bits when the default address size is 64 bits (or an implementation dependent size greater than 32 bits).

SwapGS Instruction

The processor 10 supports an instruction (referred to herein as the SwapGS instruction) for swapping the contents of two registers, at least one of which is a special purpose register (e.g. a segment register, an MSR, etc.). The SwapGS instruction may be used for supplying a pointer to operating system data structures. Specifically, the SwapGS instruction is defined in one embodiment to swap the contents of the segment base address field of the GS segment register and the contents of an MSR. The MSR (referred to below as the KernelGSBase MSR) may be initialized with an address (e.g. a pointer to a kernel data structure or other operating system data structure). In response to executing the SwapGS instruction, the contents of the segment base address field of the GS segment register and the contents of the KernelGSBase MSR are swapped.

The SwapGS instruction may be used, on entry to an operating system routine, to swap the contents of the KernelGSBase MSR and the segment base address in the GS segment register. Thus, the address to the operating system data structure may be placed in the segment base address portion of the GS segment register, and the contents of the segment base address portion of the GS segment register may be preserved in the KernelGSBase MSR. The segment base address portion of the GS segment register may be part of the application's data (e.g. if segmentation is being used in the application) or the application is using the GS segment base address for general addressing purposes).

In some embodiments for use in a multiprocessor computer system, the operating system may use the address in the KernelGSBase MSR to point to a per-processor operating system data structure. In other words, the information in the data structure may be different depending on which processor in the multiprocessor computer system is accessing the data structure. Multiple copies of the per-processor data structure may be maintained, with the same arrangement (i.e. a given element in the data structure is at the same offset from the base address of the data structure), but with different information in the elements. The KernelGSBase MSR in each of the processors may be programmed to different addresses, thus indicating the correct per-processor data structure in each processor. The code executing on each processor may be the same, with the same offset from GS accessing a given element of the per-processor data structure and the different segment base addresses in GS selecting the appropriate per-processor data structure.

Figure 5:
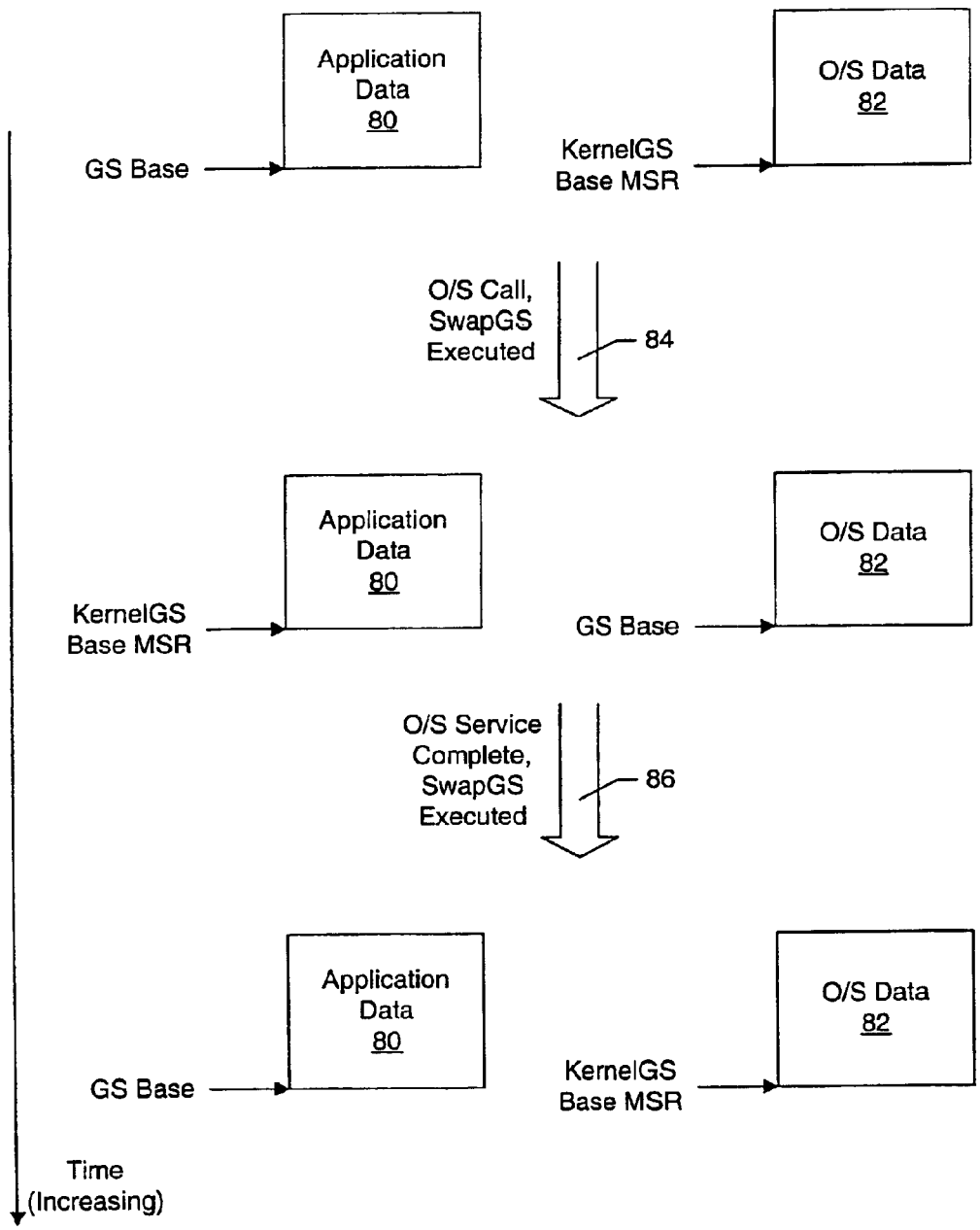
FIG. 5 is a block diagram illustrating the swapping of pointers in response to one embodiment of a SwapGS instruction.

FIG. 5 is a block diagram illustrating the swap. In FIG. 5, time is illustrated as increasing in a downward direction, as indicated by the arrow on the left side of FIG. 5. Prior to an operating system call, the GS base address field ("GS Base" in FIG. 5) is pointing to application data (reference numeral 80). The KernelGSBase MSR ("KernelGSBase MSR" in FIG. 5) is pointing to operating system (O/S) data (reference numeral 82). An operating system call is performed, and the SwapGS instruction is executed (e.g. as the initial instruction of the called operating system routine—reference numeral 84). Accordingly, the KernelGSBase MSR is shown pointing to the application data 80 after the SwapGS instruction is executed (preserving the pointer to the application data 80). The GS base address field points to the O/S data 82.

With the GS segment base address pointing to the operating system data structure, the operating system routine may access data structure elements using offsets from the GS segment base address. In the ×86 instruction set, such addressing is performed by prefixing the instruction with a prefix byte which specifies that the GS segment is to be used for that instruction. Other instructions sets may specify a segment register to be used in other fashions (e.g. implicitly or as an operand field of the instruction). Some operating systems use various segment base addresses as pointers to operating-system-generated data structures, and thus this form of addressing may be familiar to operating system code writers. Furthermore, by using a segment base address from a segment register, a general purpose register may not be consumed to store the address to the operating system data structure (allowing the general purpose registers to be used for other address/data as desired).

At the end of the operating system service, a second SwapGS instruction may be included to swap the GS segment base address and the contents of the KernelGSBase MSR again. Thus, the GS segment base address may be restored to the value which may be used by the application program, and the pointer to the operating system data structure is saved in the KernelGSBase MSR. A Sysret instruction may then be used to return to the calling application program. In FIG. 5, the completion of the operating system service and the execution of the second SwapGS instruction is illustrated at reference numeral 86. Thereafter, the GS base address field is again pointing to the application data 80 and the KernelGSBase MSR is pointing to the O/S data 82.

Thus, the SwapGS instruction (in combination with the Syscall/Sysret instructions) may be used to perform a relatively rapid operating system call which still provides a pointer to an operating system data structure. Low latency operating system calls may result, which may improve overall performance experienced by a user of the computer system. Additionally, since the SwapGS instruction does not use a general purpose register (from the register file 22) or a memory location as an operand, no general purpose registers need be saved (to preserve their values) prior to executing the SwapGS instruction. Since, when the operating system routine is entered using the Syscall instruction, there is no readily accessible pointer to the operating system data structures (such as the operating system stack), storing general purpose register values would be problematic. However, the SwapGS instruction may also be used with other calling conventions (e.g. the gate mechanism described above) to rapidly obtain a pointer to an operating system data structure. The SwapGS instruction may provide such a pointer internal to the processor 10, in a register-register transfer, rather than a memory access to the operating system's stack to obtain the pointer.

While the example herein uses an MSR as the register used to swap with the segment base address portion of a segment register, other embodiments may use any type of register. For example, a special purpose register may be used. Generally, a special purpose register is any register which is reserved for a particular use. Special purpose registers are often not specifiable as an operand for any random instruction in the instruction set, like general purpose registers are specifiable. Predefined instructions are usually used to access such registers. For example, the MSRs are accessed using RDMSR and WRMSR instructions. These instructions are privileged, so that only privileged code (e.g. the operating system) may access/update the MSRs.

While the GS segment register is used for the SwapGS instruction, other embodiments may use any segment register, as desired. Furthermore, embodiments using instruction sets other than the x86 but which include segmentation may use any segment register according to the instruction set definition. Still further, embodiments which use a general purpose register and a special purpose register for the swap are contemplated (in which the special purpose register is initialized with the pointer to the operating system data and the general purpose register is used by the operating system routine to address the operating system data structure, after executing the SwapGS instruction).

It is noted that the term "kernel" is used above to describe certain data structures, and as part of the name of the KernelGSBase MSR. Generally, the kernel is a portion of the operating system containing the most fundamental operating system services. The kernel is generally locked into memory (i.e. it cannot be paged out to disk). Other portions of the operating system may be paged out. The SwapGS instruction may be used in routines within the kernel, but may also be used for any operating system routines. Furthermore, the SwapGS instruction may be used to swap any values between the segment base address field of the segment register and the KernelGSBase MSR, as desired.

The SwapGS instruction may use any encoding. In one embodiment, the SwapGS encoding may be the following bytes (in hexadecimal): 0f 01 fc. Such an encoding may be compatible with the x86 architecture, although other embodiments may use other encodings compatible with the x86 architecture or any other instruction set architecture.

Figure 6:
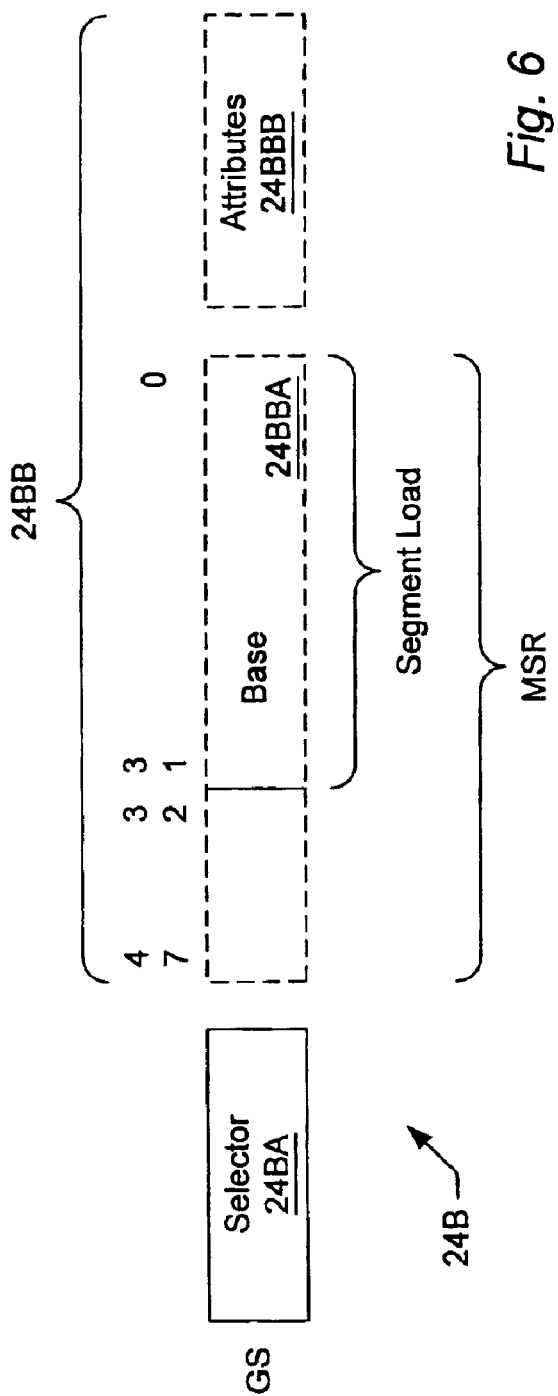
FIG. 6 is a block diagram of one embodiment of a segment register.

Turning now to FIG. 6, a block diagram of one embodiment of the GS segment register 24B is shown. Other embodiments are possible and contemplated. In the embodiment of FIG. 6, similar to the segment register 24A illustrated in FIG. 1, the segment register 24B may include a selector field 24BA and a descriptor field 24BB. The selector field 24BA stores the segment selector, and the descriptor field 24BB stores descriptor information. The descriptor field 24BB is shown in greater detail to include a base address field 24BBA and an attributes field 24BBB.

The GS segment register 24B may be updated using a segment load instruction when the GS segment register 24B is being used to identify a segment (e.g. in compatibility mode). The "segment load instruction" specifies the segment selector as an operand, and the processor 10 loads the segment descriptor from the specified segment table in response to the segment load instruction. Particularly, the segment base address from the segment descriptor located by the segment selector is loaded into the base address field 24BBA and attributes (e.g. including the segment limit and other attributes such as those shown in FIGS. 2 and 3) from the segment descriptor are loaded into the attributes field 24BBB. The segment selector from the segment load instruction is loaded into the selector field 24BA.

Since the base address field 24BBA is expanded to allow for the larger virtual addresses in 32/64 mode, the segment base address in the segment descriptor (which is 32 bits in the embodiment illustrated in FIG. 3) does not fill the base address field 24BBA. Instead, a subfield of the base address field 24BBA (indicated by the brace labeled segment load in FIG. 6) may be updated with the base address from the segment descriptor. The remainder of the base address field 24BBA may be filled with zeros, in one embodiment, or may be sign extended or unmodified, as desired. While the segment base address in the segment descriptor is 32 bits in the present embodiment, other embodiments may define a different sized segment base address, as desired.

On the other hand, when the GS segment register 24B is used to provide a base address in 32/64 mode, the base address field 24BBA is written with the desired base address. Since the base address exceeds 32 bits in 32/64 mode, the base address field 24BBA is expanded to exceed 32 bits. In the illustrated embodiment, the base address field is expanded to the implemented virtual address size (e.g. 48 bits, although other embodiments may support more or fewer virtual address bits up to, e.g., 64 bits).

The base address field 24BBA exceeds the size of the base address in the segment descriptor. Accordingly, a segment load instruction is not used to load base address field 24BBA for use in 32/64 mode. The base address field 24BBA is mapped to an MSR (as indicated by the brace labeled MSR in FIG. 6). Thus, a write to MSR (WRMSR) instruction may be used to address the base address field 24BBA directly to provide a base address of the appropriate size. The term "model specific register" refers to a register defined, on a processor model basis, to store specific information. Other processor models may not employ the same register, or may define the register differently. The read MSR (RDMSR) and WRMSR instructions each include at least one operand used to specify the MSR address within an MSR address space. An MSR address is assigned to the base address field 24BBA to map the MSR to the base address field 24BBA. It is noted that the MSR to which the base address field 24BBA is mapped is different from the KernelGSBase MSR (i.e. they have different addresses within the MSR address space).

While FIG. 6 illustrates the GS segment register 24B, other embodiments may include additional segment registers similar to GS segment register 24B. For example, one implementation includes the FS and GS segment registers similar to register 24B, while other segment registers may include a base address field capable of storing only the base address from the segment descriptor. Other embodiments may have any subset of the segment registers 24 configured as shown in FIG. 6, including an embodiment in which all segment registers are configured as shown in FIG. 6.

Figure 7:
FIG. 7 is a block diagram of one embodiment of a model specific register.

Turning now to FIG. 7, a block diagram illustrating one embodiment of the KernelGSBase MSR 36A is shown. Other embodiments are possible and contemplated. The KernelGSBase MSR 36A may be one of the MSRs 36 illustrated in FIG. 1. As illustrated in FIG. 7, the KernelGSBase MSR 36A comprises a 64 bit kernel base address. For use with the embodiment of the GS segment register 24B illustrated in FIG. 6, in which the segment base address is 48 bits, the kernel base address may be required to be in a particular form to be valid. The form is referred to as canonical form, and may specify that the most significant bits of the address which are not part of the implemented virtual address (e.g. bits 63:48 in the present embodiment) match the most significant implemented bit (bit 47). The check for canonical form may be part of the WRMSR instruction which stores the address in the KernelGSBase MSR 36A.

Figure 8:
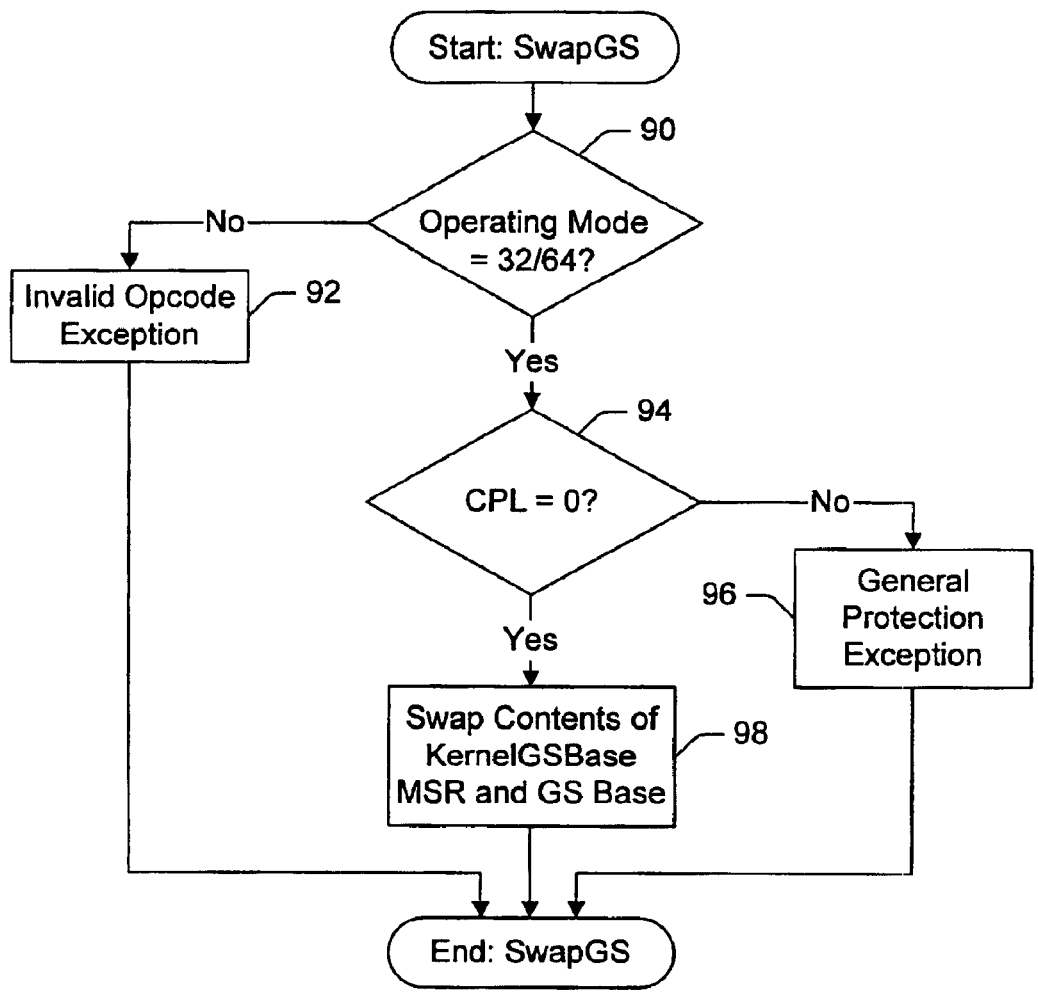
FIG. 8 is a flowchart illustrating operation of one embodiment of an execution core in response to a SwapGS instruction.

Turning now to FIG. 8, a flowchart is shown illustrating operation of one embodiment of the execution core 14 in response to a SwapGS instruction. Other embodiments are possible and contemplated. While the blocks shown in FIG. 8 are illustrated in a particular order for ease of understanding, any order may be used. Furthermore, blocks may be performed in parallel in combinatorial logic circuitry within the execution core 14. Still further, various blocks may be performed at different pipeline stages, as desired. Embodiments in which all or a portion of the flowchart of FIG. 8 is implemented in microcode are also contemplated.

The execution core 14 may be configured to execute the SwapGS instruction only if the operating mode is 32/64 (decision block 90). If the operating mode is not 32/64 (e.g. the operating mode is compatibility mode or legacy mode), the execution core 14 may signal an invalid opcode exception (block 92).

As mentioned above, the SwapGS instruction may be privileged (e.g. to help prevent application programs from directly accessing operating system data structures while allowing the application programs to use the GS segment register as desired). Accordingly, if the privilege level active in the processor 10 is insufficient to execute a privileged instruction (decision block 94), the execution core 14 may signal a general protection exception (block 96). The definition or privilege level may vary from architecture to architecture. In the x86 architecture, a four state privilege level is provided. Privilege level 0 is the most privileged, and privilege level 3 is the least privileged. Privileged instructions are executable at privilege level 0 and result in an exception for other privilege levels. Other architectures may include as few as two privilege levels (privileged and non-privileged). Any number of privilege levels may be defined, as desired.

If the current privilege level allows execution of the SwapGS instruction, the execution core 14 swaps the contents of the KernelGSBase MSR and the GS Base (block 98).

It is noted that, while some of the above embodiments are described in the context of a 32/64 operating mode, other embodiments may employ the SwapGS instruction in any operating mode. Furthermore, while the above embodiments swap a segment base address and the address from another register (e.g. the KernelGSBase MSR), other embodiments may swap segment attributes and a segment selector as well. Such embodiments may be used in operating modes in which segmentation is enabled. In such embodiments, the segment descriptor in the segment descriptor table which corresponds to the segment selector swapped into the segment register may be set up to correspond to the information swapped into the segment register (similar to the way in which code segments corresponding to the data loaded into the code segment register during execution of Syscall and Sysret instructions are stored at specified offsets in the segment descriptor tables).

Figure 9:
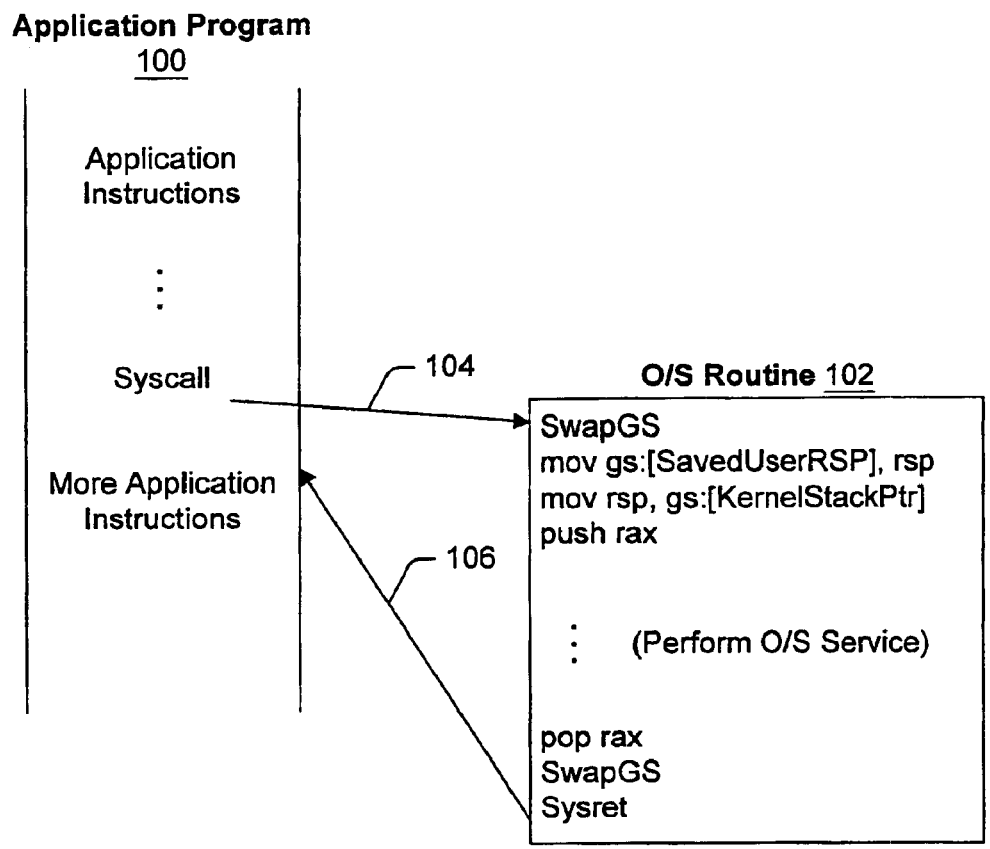
FIG. 9 is a block diagram illustrating an exemplary application program which calls an operating system routine which includes the SwapGS instruction.

FIG. 9 is a block diagram illustrating an exemplary application program 100 and an operating system (O/S) routine 102 called by the application program 100. The application program 100 includes various application instructions, a Syscall instruction to call the O/S routine 102, and additional application instructions to be executed after the O/S service provided by the O/S routine 102.

The Syscall instruction causes a branch to the O/S routine 102 (illustrated by the arrow 104). The initial instruction in the O/S routine 102 is the SwapGS instruction, thereby loading the GS Base with the pointer to an O/S data structure. It is noted that the SwapGS instruction need not necessarily be the initial instruction of the routine. For example, instructions which do not change state of non-preserved application resources may be included first. Furthermore, the calling conventions may specify that some register values are not preserved. These registers may be changed by instructions prior to the SwapGS instruction, if desired.

After the SwapGS instruction in the illustrated routine is: (i) an instruction which stores the RSP (the stack pointer register) in a location within the O/S data structure (given by the offset SavedUserRSP), and (ii) an instruction which loads a stack pointer for the O/S routine 102 to use from another location within the O/S data structure (given by the offset KernelStackPtr). The offsets are relative to the GS Base address. Once a pointer to a stack used by the O/S routine 102 is established, register values may be stored to the stack (e.g. the push rax instruction illustrated in FIG. 9) and may be used to store values operated upon and generated by the O/S routine 102.

Additional instructions may be included as desired to perform the O/S service. Subsequently, in the illustrated example, register values saved to the stack may be restored (e.g. the pop rax instruction illustrated in FIG. 9). Another SwapGS instruction may be included to swap the GS segment base address in effect upon entry to the O/S routine 102 back into the segment base address portion of the GS segment register (and to save the pointer to the O/S data structure back into the KernelGSBase MSR). A Sysret instruction may then return instruction execution to the instructions following the Syscall (arrow 106).

It is noted that, while the exemplary O/S routine 102 includes instructions to save the application program's stack pointer and load a stack pointer to a stack used by the O/S routine 102, other embodiments may not require an O/S stack. For example, the O/S data structure may include locations to store application register values so that the registers may be freed for use by the O/S routine 102.

Software Embodiments

While the above description may generally have described a processor which may directly support, in hardware, the processor architecture having the features described above, it is contemplated that other processor embodiments may not directly implement the processor architecture. Instead, such embodiments may directly implement a different processor architecture (referred to below as a native processor architecture, which may define a native instruction set including native instructions). Any native processor architecture may be used. For example, the MIPS, Power PC, Alpha, Sparc, ARM, etc. architectures may be used. The processor architecture may be implemented in software executing on the native processor architecture in a variety of fashions, using any native processor architecture such as, for example, the Crusoe products of Transmeta Corporation.

Generally, a processor embodiment implementing a native processor architecture different than the processor architecture described above (referred to below as the non-native processor architecture) may support the non-native processor architecture in a variety of fashions. For example, such a processor embodiment may execute interpreter software which reads each non-native instruction in a non-native code sequence as data, and executes various software routines which emulate the defined operation of the nonnative instruction as defined in the non-native processor architecture. Alternatively, translator software may be executed. The translator software may translate the non-native instructions in the code sequence to an equivalent set of native instructions defined by the native instruction set architecture. The native code sequence may be stored in memory, and may be executed instead of the corresponding non-native code sequence. In yet another alternative, a mixture of interpretation and translation may be used. For example, the code sequence may be interpreted, but the interpreter may also generate statistics about which parts of the code sequence are being most frequently executed. The most frequently executed portions may then be translated to native code sequences.

In any of the above methods, the architected state defined by the non-native processor architecture may be maintained by the combination of the processor and the software (interpreter or translator) in a variety of fashions. For example, the non-native architected state may be mapped to memory locations in a memory addressable by the processor, to general registers defined by the native processor architecture (by software convention, either in the interpreter or in the translator), or the processor may directly support the non-native architected state by defining registers or other storage hardware within the processor that corresponds to the non-native architected state. The non-native architected state may be stored using any combination of the above methods, as desired.

Generally, the architected state includes any state defined to exist by the architecture. For example, in the above described embodiment, the non-native architected state may include general registers (e.g. RAX, RBX, etc.), segment registers, control registers, other registers such as the model specific registers (MSRs), etc. Additionally, the architected state may include data structures defined for the operating system to create, such as the descriptor tables, page tables, task state segments, etc.

Figure 10:
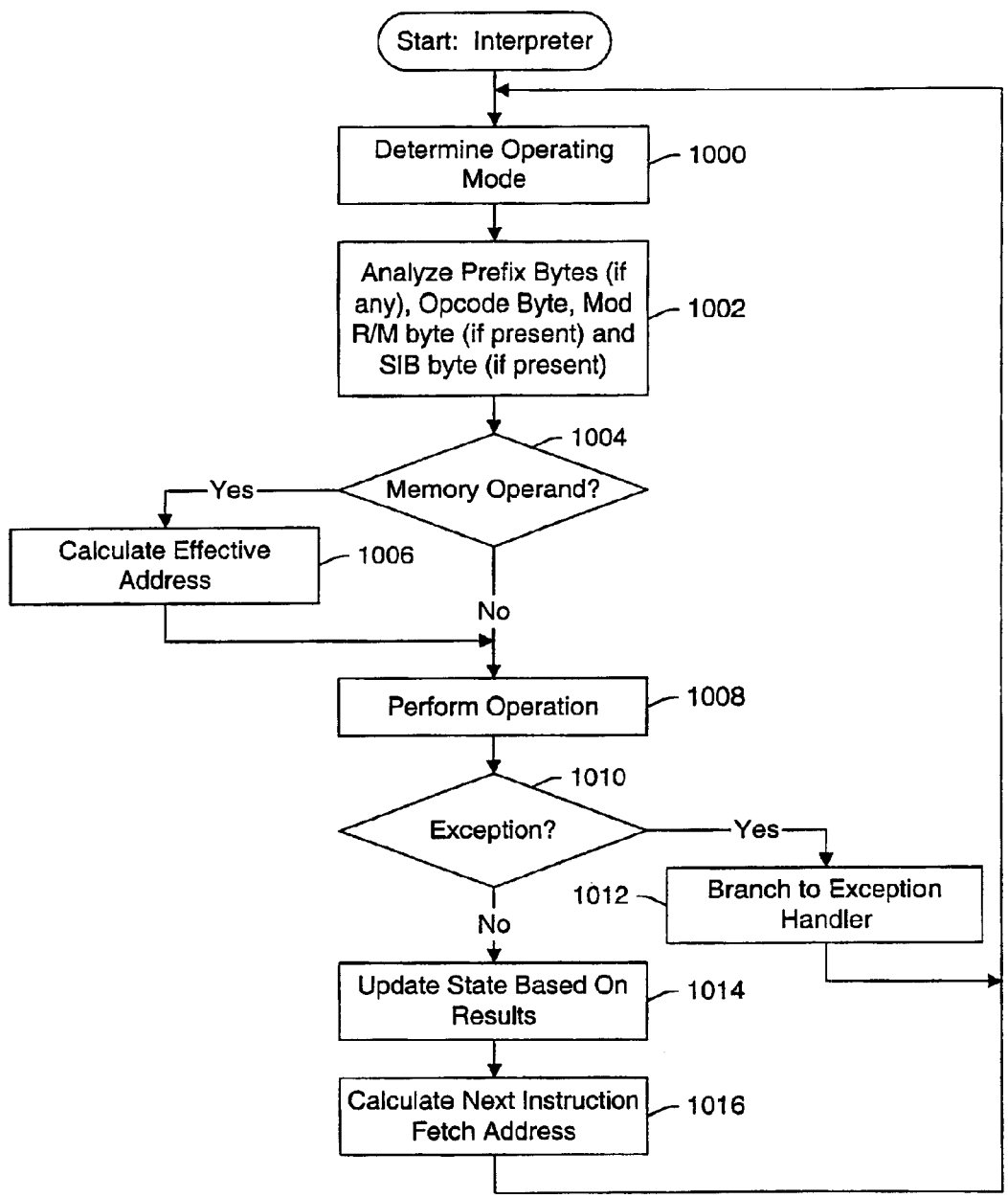
FIG. 10 is a flowchart illustrating one embodiment of an interpreter.

Turning to FIG. 10, a flowchart illustrating an exemplary interpreter which may be used to interpret non-native instructions is shown. Other embodiments are possible and contemplated. While the blocks shown are illustrated in a particular order for ease of understanding, any suitable order may be used. Furthermore, blocks may be performed in parallel, as desired.

The blocks shown in FIG. 10 illustrate the emulation of one non-native instruction. Generally, the interpreter may execute the blocks shown in FIG. 10 for each non-native instruction to be executed according to the non-native code sequence to be executed.

The interpreter may determine the operating mode for the non-native instruction (block 1000). As described above, the operating mode may be determined from the LMA bit in control register 26 and the L bit and D bit from the code segment descriptor indicated by the CS segment register. The operating mode may be determined anew from the LMA, L bit, and D bit for each non-native instruction, or the resulting operating mode may be stored in a temporary register for access by the interpreter for each non-native instruction. If the resulting operating mode is stored, the interpreter may update the stored operating mode if an instruction modifies the CS segment register or interrupt or exception handling causes the operating mode to change. As mentioned above, the CS segment register and the control register(s) (which are part of the non-native architected state) may actually be memory locations, general registers, or special purpose registers, or any combination thereof.

The interpreter may read the current non-native instruction from memory, and may analyze the non-native instruction to determine the operations to be taken to emulate the non-native instruction (block 1002). The interpreter may read the non-native instruction one byte at a time, or may read a suitable set of consecutive bytes and process the bytes. For example, a native processor architecture in which operands are 32 bit may read 32 bits (4 bytes) of the non-native instruction at a time, and then may process the four bytes before reading any additional bytes.

Generally, the interpreter software may decode the non-native instruction in a manner analogous to processor 10 decoding the instruction in hardware. Thus, for the illustrated non-native processor architecture, which is compatible with the x86 processor architecture, the analyzing of the non-native instruction includes analyzing any prefix bytes which may precede the opcode byte, analyzing the opcode byte, analyzing the addressing mode (Mod R/M) byte (if present), and analyzing the scale-index-base (SIB) byte (if present). Prefix bytes may override the operating mode, and may also include register specifier bits (e.g. the REX prefix byte). The opcode byte specifies the operation to be performed, and in some cases may include a register specifier or may implicitly specify an operand (e.g. the stack or the stack pointer). The Mod RIM byte specifies operands (including any displacement operands which may follow the Mod RIM byte or the SIB byte, if the SIB byte is present) and may include register specifiers. Finally, the SIB byte may include register specifiers. From the information gained from analyzing the non-native instruction, the interpreter has the information to emulate the non-native instruction (including operating mode for the non-native instruction, which specifies the operand size and address size of the non-native instruction, operands, the operation to be performed, etc.).

If the non-native instruction includes a memory operand (decision block 1004), the interpreter may calculate the effective address of the instruction (block 1006). If the non-native instruction has a memory operand, some of the operands identified in block 1002 may be address operands used to generate the effective address. Thus, the interpreter may read the address operands from the non-native architected state and may add them to generate an effective address. The size of the effective address may be determined by the address size for the instruction, as determined at blocks 1000 and 1002. It is noted that the native processor architecture may support an address size which is less than the address size supported by the non-native processor architecture. For example, in one exemplary embodiment described above, the virtual address size may be 48 bits in 32/64 mode. The native processor may, for example, support a virtual address size of 32 bits. In such an embodiment, block 1006 may represent a series of calculations in which the least significant bits (e.g. 32 bits) of the virtual address may be calculated, and any carry from the least significant bits may be carried into a calculation of the most significant bits of the virtual address.

The interpreter may then perform the operation specified by the non-native instruction (block 1008). If the non-native instruction includes a memory operand as a source operand, the interpreter may read the memory operand from the effective address calculated at block 1006. Other operands may be read from the non-native architected state. The operation may include an arithmetic operation, a logical operation, a shift, a move to another storage location, etc. The native processor architecture may support an operand size smaller than the operand size of the instruction. In such cases, performing the operation may include multiple calculations on portions of the operand to calculate the result.

The interpreter determines if the non-native instruction resulted in an exception (decision block 1010). Generally, exceptions may occur throughout the execution of the operations specified by the non-native instruction. For example, accessing a source memory operand may result in a page fault before any of the actual instruction operation is performed. During the operations, various architecturally-defined exceptions may also occur. The interpreter may interrupt processing of the non-native instruction upon detecting an exception, and may branch to exception handler instructions (block 1012). The exception handler may be native code or non-native code or a combination thereof, as desired. If the non-native processor architecture specifies the update of any architected state when an exception is taken (e.g. various control registers may store the address of the exception causing instruction, the exception reason, etc.), the interpreter may update the non-native architected state as defined.

It is noted that the interpreter software is executing on the native processor, and thus is subject to experiencing exceptions as defined in the native processor architecture. These exceptions may generally be different from the exceptions detected by the interpreter software, which are exceptions experienced by the non-native code being interpreted according to the non-native processor architecture.

If no exception occurs during emulation of the non-native instruction, the interpreter may update the non-native architected state according to the definition of the non-native instruction (block 1014). Finally, the interpreter may calculate the next non-native instruction fetch address to fetch the next instruction (block 1016). The next fetch address may be sequential to the current non-native instruction, or may be a different address (e.g. if the current non-native instruction is a taken branch, the next fetch address may be the target address of the branch instruction).

It is noted that the interpreter may operate in protected mode, using virtual addresses. In other words, the effective address calculated at block 1006 may be a virtual address which is translated by the translation mechanism specified by the non-native processor architecture to a physical address. The processor may include a translation lookaside buffer (TLB) used to cache translations. The processor may either support reload of the TLB from the non-native translation tables (page tables), or may take an exception on a TLB miss to allow software reload of the TLB.

Generally, the interpreter may perform the flowchart of FIG. 8 at any suitable point in the processing of the SwapGS instruction, or during several of the blocks shown in FIG. 10. For example, block 90, 92, 94, and 96 may be performed within blocks 1010 and 1012. Block 98 may be performed as part of blocks 1008 and 1014.

Figure 11:
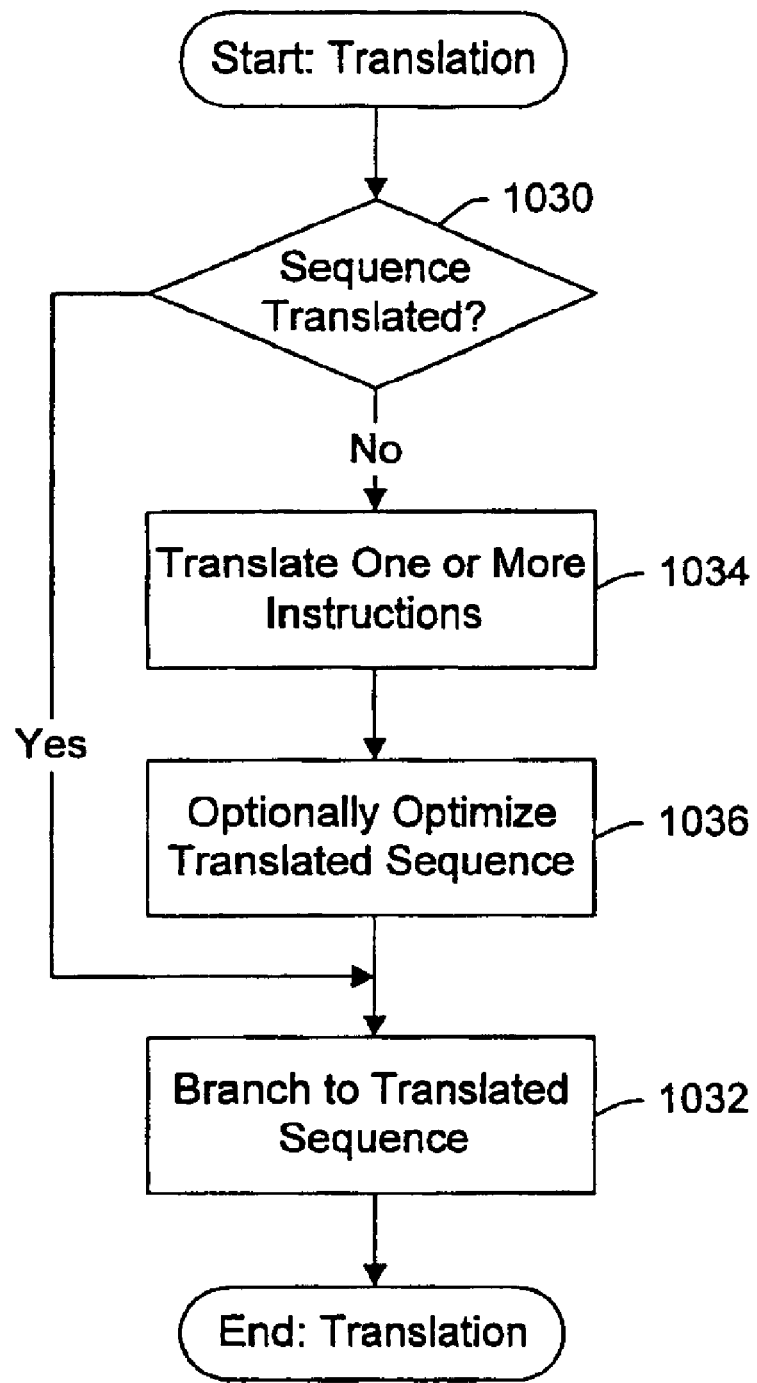
FIG. 11 is a flowchart illustrating one embodiment of a translator.

Turning to FIG. 11, a flowchart illustrating an exemplary translator which may be used to translate non-native instructions in the non-native processor architecture to native instructions in the native processor architecture. Other embodiments are possible and contemplated. While the blocks shown are illustrated in a particular order for ease of understanding, any suitable order may be used. Furthermore, blocks may be performed in parallel, as desired.

The blocks shown in FIG. 11 illustrate the translation of one non-native code sequence responsive to a fetch address for the first instruction in the non-native code sequence. The code translator may translate any number of non-native instructions to produce a translated code sequence having native instructions. For example, the translator may translate from the initial non-native instruction to a basic block boundary (i.e. a branch instruction). Alternatively, the translator may speculatively translate two or more basic blocks or may translate up to a maximum number of non-native or resulting native instructions, if desired.

Generally, the translator may maintain a translation cache which stores translated code sequences previously produced by the translator. The translation cache may identify translated code sequences by the fetch address of the first non-native instruction in the corresponding non-native code sequences. Thus, the translator may determine if a translated code sequence corresponding to the fetch address is stored in the translation cache (decision block 1030). If there is a translated code sequence in the translation cache, the translator may cause the processor to branch to that translated code sequence (block 1032). On the other hand, if there is no translated code sequence, the translator may translate one or more non-native instructions from the non-native code sequence into native instructions in a translated code sequence (block 1034).

Generally, the translator may translate each non-native instruction into one or more native instructions which, when executed, may perform the same operation on the non-native architected state that the non-native instruction would have performed. The translator may generally perform the same decoding of instructions as is performed by the interpreter (block 1002 in FIG. 10) to determine what operations may need to be performed. For example, if the native processor architecture is a load/store architecture in which memory operands are accessed using explicit load/store instructions and other instruction use only register operands, load and store instructions may be used to access the memory operands and other instructions may be used to perform the explicit operation of a non-native instruction having a memory operand. The translated instructions may make use of temporary registers to hold intermediate values corresponding to the execution of the non-native instruction. Additionally, the translated instructions may access the non-native architected state to retrieve operands and may update the non-native architected state with the final results of the non-native instruction. Generally, the native instructions corresponding to the non-native instruction may perform all of the operations defined for the instruction (e.g. blocks 1006, 1008, 1010, 1014, and 1016 in FIG. 10).

Once the translator has determined to terminate translation and save the translated sequence for execution, the translator may optionally optimize the translated code sequence (block 1036). The optimizations may include reordering the translated instructions for quicker execution, eliminating redundancies (e.g. redundant memory references, which may occur if multiple non-native instructions in the source code sequence accessed the same memory location), etc. Any suitable set of optimizations may be used. The resulting translated code sequence may then be stored into the translation cache. Additionally, the processor may branch to the translated code sequence and execute the sequence (block 1032).

It is noted that, while the above description may refer to accessing and/or updating non-native architected state, including various registers, the non-native architected state may be stored in any suitable fashion. For example, architected registers may actually be stored in memory locations, as highlighted above. The mapping of architected registers from the non-native processor architecture to memory locations may be used in either of the interpreter or the translator embodiments, or combinations thereof, to locate the non-architected state used during execution of the non-native instruction or affected by the execution of the non-native instruction. Thus, instructions which access the non-native architected state may perform memory reads/writes or register reads/writes, as the case may be.

Figure 12:
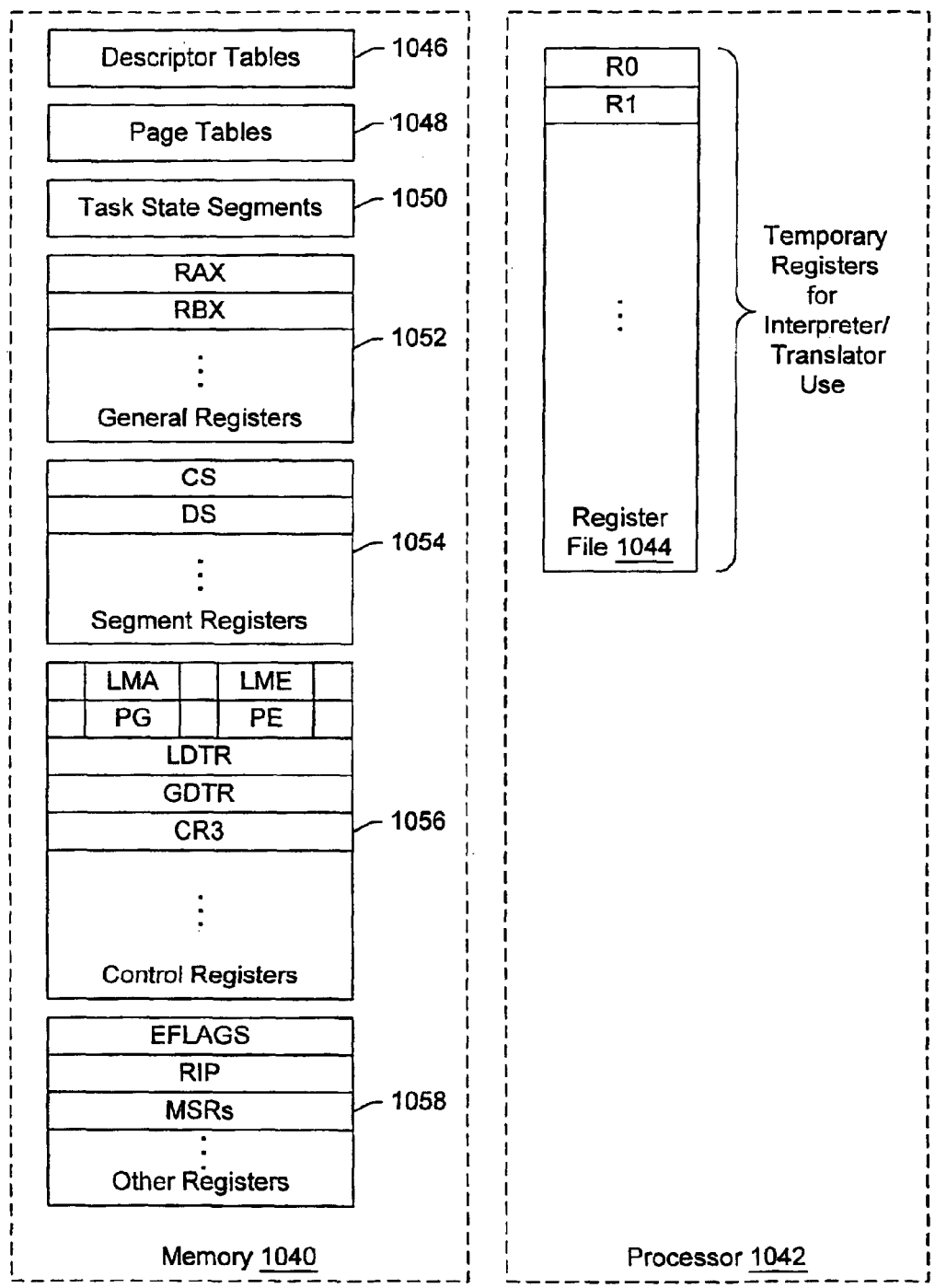
FIG. 12 is a block diagram illustrating one embodiment of mapping non-native architected state.

Turning next to FIG. 12, a block diagram illustrating one exemplary mapping of non-native architected state to either memory locations in a memory 1040 or to processor resources in a native processor 1042. Native processor 1042 includes a register file 1044 including the architected general registers of the native processor architecture. Any number of registers may be provided.

In the embodiment of FIG. 12, all of the non-native architected state is mapped to memory 1040. For example, descriptor tables 1046 (which may include a global descriptor table, a local descriptor table, and an interrupt descriptor table), page tables 1048 (which store virtual to physical address translations), task state segments 1050, general registers 1052, segment registers 1054, control registers 1056, and other registers 1058 may represent non-native architected state.

Thus, in the embodiment of FIG. 12, to access any non-native architected state, a memory access may be performed. For example, if a non-native instruction has one of the general registers as an operand, the interpreter or translated native instruction performs a memory access to the memory location mapped to that general register to access or update that general register. The registers in register file 1044 may be used by the interpreter or translator as temporary registers to hold intermediate results or for other local interpreter/translator state.

General registers 1052 may include integer general registers (e.g. RAX, RBX, etc. as described above), the additional integer general registers defined by the REX prefix byte, floating point registers, Streaming Single Instruction, Multiple Data (SIMD) Extension (SSE) registers, and the additional SSE registers defined by the REX prefix byte.

Segment registers 1054 may include storage locations corresponding to the segment registers 24 shown in FIG. 1 above, and may also include the GS segment register 24B shown in FIG. 6.

Control registers 1056 may include storage locations corresponding to various control registers defined in the non-native processor architecture. For example, control registers storing the LMA, LME, PG and PE bits, as well as the LDTR and GDTR registers and the CR3 register (which stores the base address of the page tables 1048) are shown. Other control registers may be included as well.

Other registers 1058 includes any remaining architected registers. For example, the EFLAGS register (which stores condition code information), the instruction pointer (RIP) register (which stores the address of the instruction to be executed), and the model specific registers (MSRs) may be included in other registers 1058. The KernelGSBase MSR shown in FIG. 7 may be included in other registers 1058.

Figure 13:
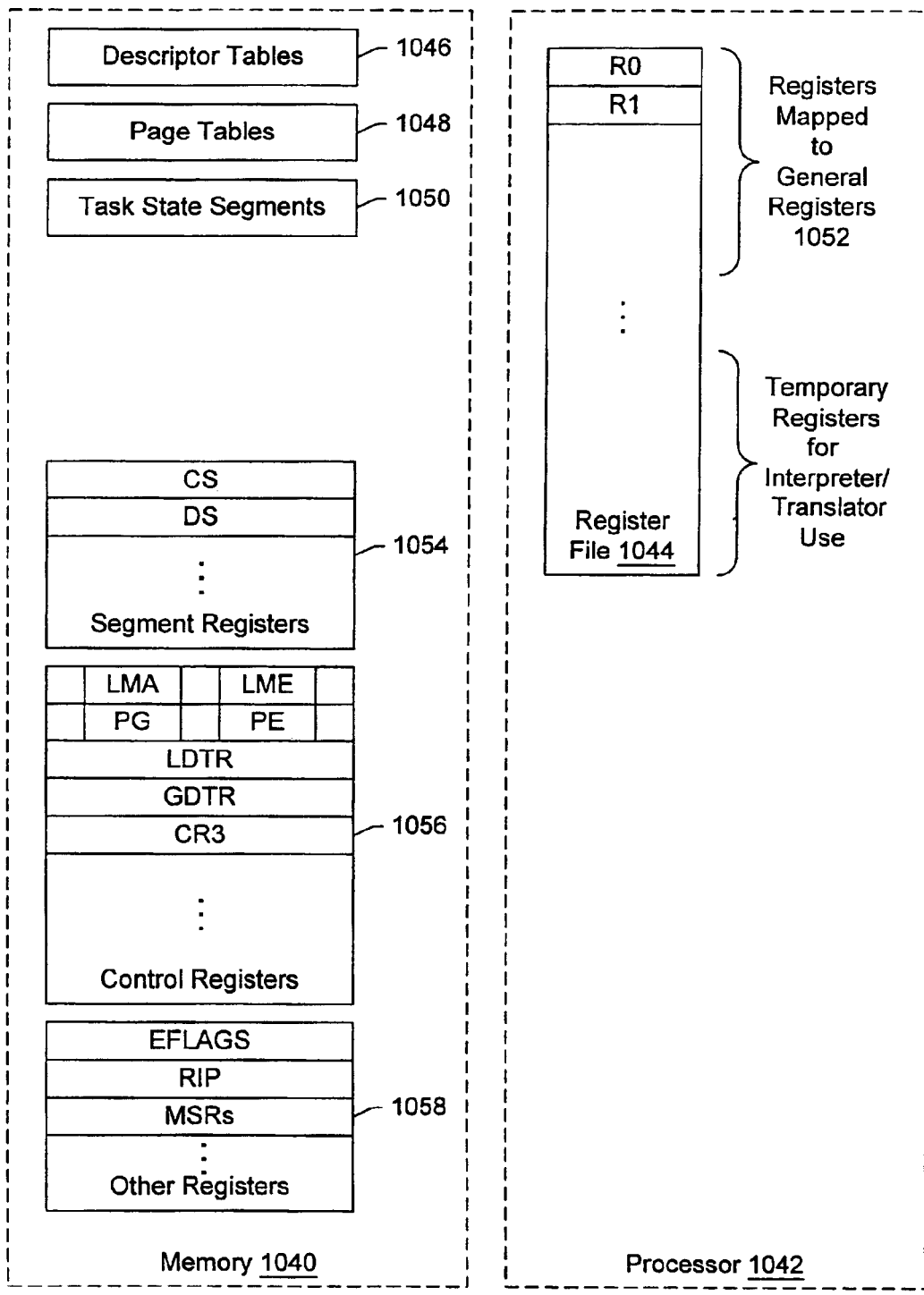
FIG. 13 is a block diagram illustrating a second embodiment of mapping non-native architected state.

While the example of FIG. 12 maps all of the non-native architected state to memory 1040, other embodiments may implement other mappings. In FIG. 13, for example, some of the general registers in register file 1044 are mapped to the general registers 1052. Accordingly, if a non-native instruction has a general register as an operand, the interpreter accesses the corresponding register in register file 1044. Similarly, the translator generates a translated instruction having the corresponding register in register file 1044 as an operand. Other architected state may still be accessed via memory operations in the embodiment of FIG. 13. Other registers in register file 1044 which are not assigned to non-native architected state may again be used as temporary registers for interpreter or translator use, as described above.

While the embodiment of FIG. 13 illustrates mapping the general registers 1052 to registers in register file 1044, any other non-native architected state may be mapped to registers in register file 1044. For example, any of segment registers 1054, control registers 1056, or other registers 1058 (or portions of any of these registers) may be mapped to register file 1044, as desired.

Figure 14:
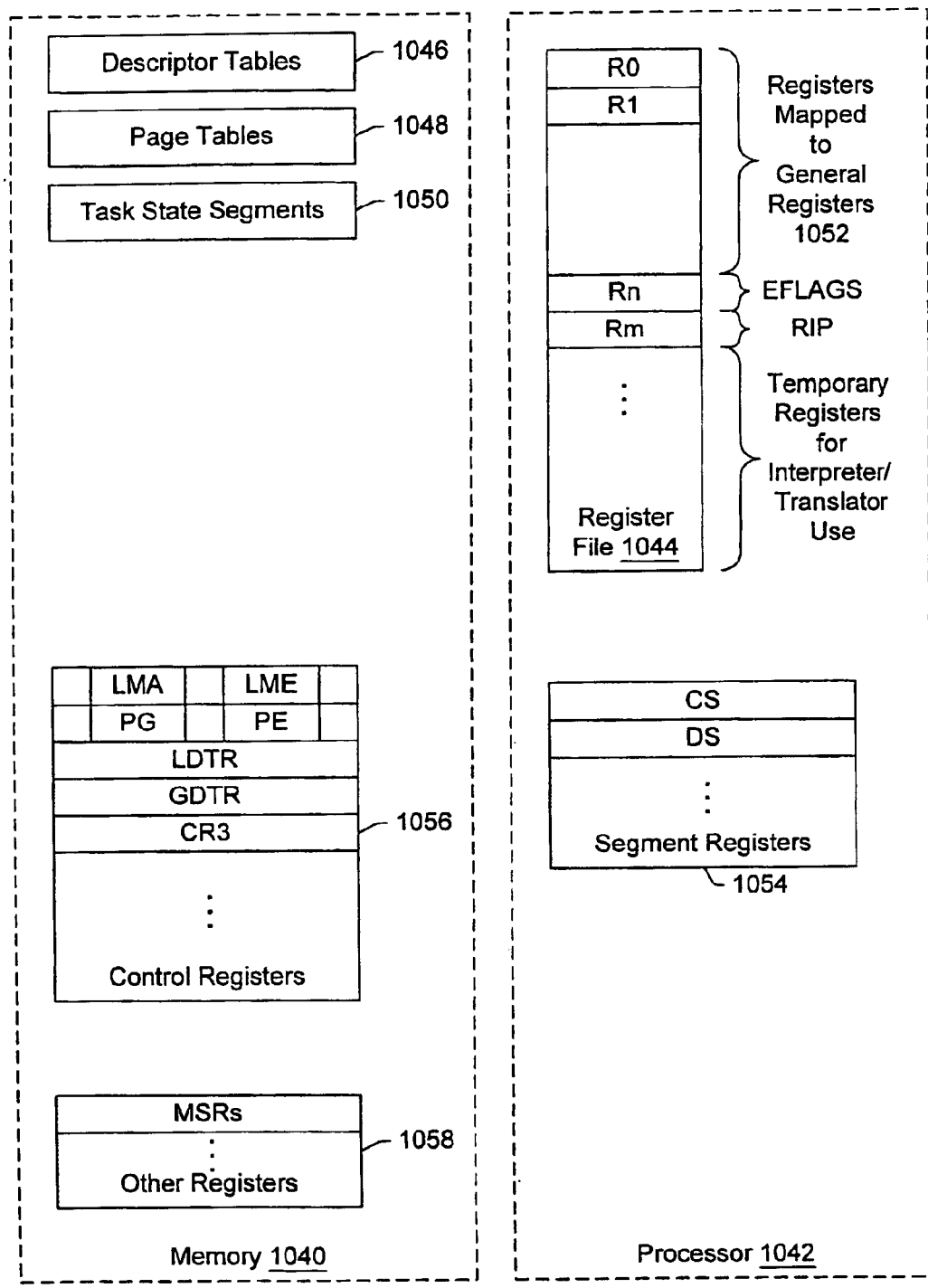
FIG. 14 is a block diagram illustrating a third embodiment of mapping non-native architected state.

FIG. 14 illustrates another example in which the general registers 1052 and the EFLAGS and RIP registers are mapped to registers in register file 1044. Additionally, in the example of FIG. 14, the segment registers 1054 are implemented in hardware in processor 1042. More specifically, processor 1042 may not only implement storage for segment registers 1054, but may also include logic to generate the operating mode for instructions based on the information in the segment registers. Furthermore, for compatibility modes, the logic may include limit checks and attribute checks to ensure that accesses to the segment attempted by the non-native instructions (or the non-native instructions in the interpreter or the translated code sequence which correspond to the non-native instructions) are permitted.

Similarly, other embodiments may implement various control registers 1056 or other registers 1058 in hardware, including corresponding logic to act on the contents of the registers as defined in the non-native architecture. Generally, various embodiments of processor 1042 may implement any non-native architected state in hardware. Certain architected state may generally be implemented in memory since the non-native processor architecture defines the state to be in memory (e.g. descriptor tables 1046, pages tables 1048, and task state segments 1050). Such memory-based architected state may be cached in caches within processor 1042 (e.g. TLBs for page table information, hidden segment register portions for segment descriptor information, etc.).

As the above discussion illustrates, the non-native architected state may be stored in any storage location. Generally, a storage location is a location capable of storing a value. Storage locations may include, in various embodiments, a memory location, a general register mapped to the non-native architected state, or a special purpose register (which may include additional hardware to interpret the contents of the register), depending upon the embodiment. Additionally, storage locations could include a scratch pad RAM (such as a portion of a cache predetermined to be used as scratch pad RAM).

Figure 15:
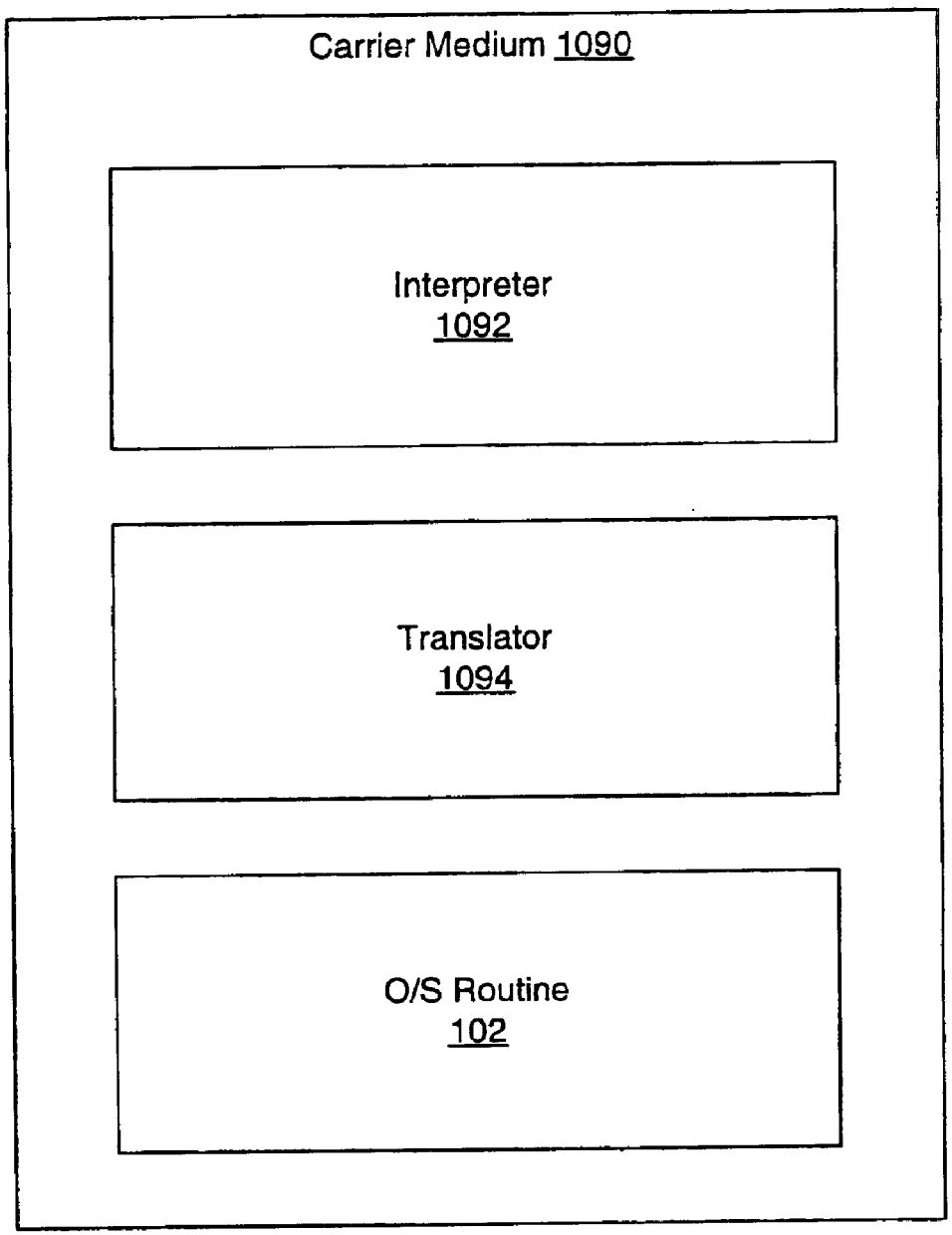
FIG. 15 is a block diagram of one embodiment of a carrier medium.

FIG. 15 is a block diagram of one embodiment of a carrier medium 1090. Other embodiments are possible and contemplated. In the embodiment of FIG. 15, carrier medium 1090 stores an interpreter program 1092 and a translator program 1094. Additionally, the carrier medium 1090 may further include the O/S routine 102

Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link. Carrier medium 1090 may thus be coupled to a computer system including processor 1042, may be part of a computer system including processor 1042, or may be a communication medium on which the computer system is capable of communicating. Computer systems including processor 1042 may be of any construction. For example, computer systems similar to those shown in FIGS. 16 and 17 may be suitable.

Interpreter program 1090 may operate according to the flowchart of FIG. 10. Translator program 1094 may operate according to the flowchart of FIG. 11. Generally, interpreter program 1092 and translator program 1094 may each comprise code sequences including native instructions.

Computer Systems

Figure 16:
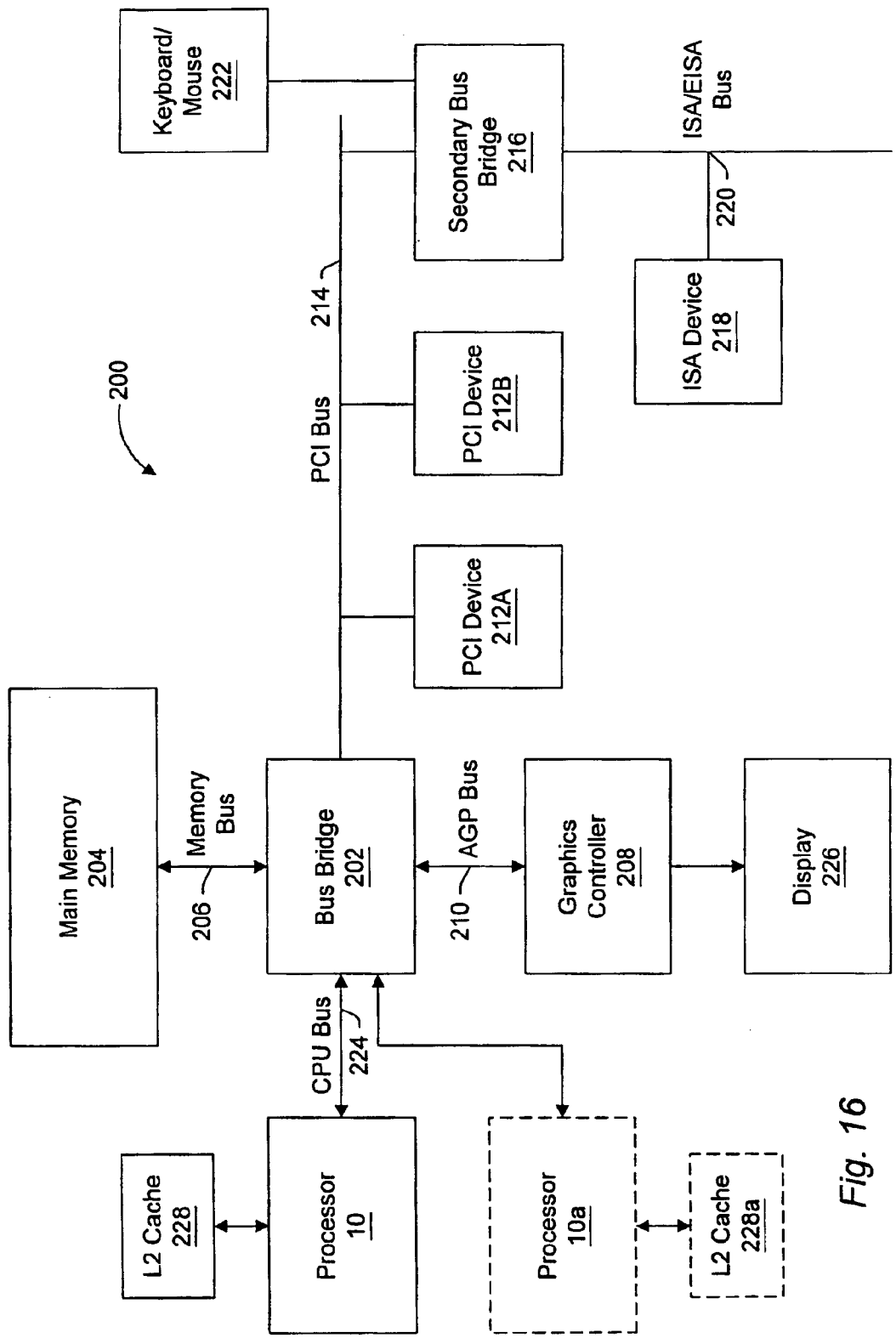
FIG. 16 is a block diagram of one embodiment of a computer system including the processor shown in FIG. 1.

Turning now to FIG. 16, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of 0PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10amay be an identical copy of processor 10. Processor 10a may be connected to bus bridge 202 via an independent bus (as shown in FIG. 16) or may share CPU bus 224 with processor 10. Furthermore, processor 10a may be coupled to an optional L2 cache 228a similar to L2 cache 228.

Figure 17:
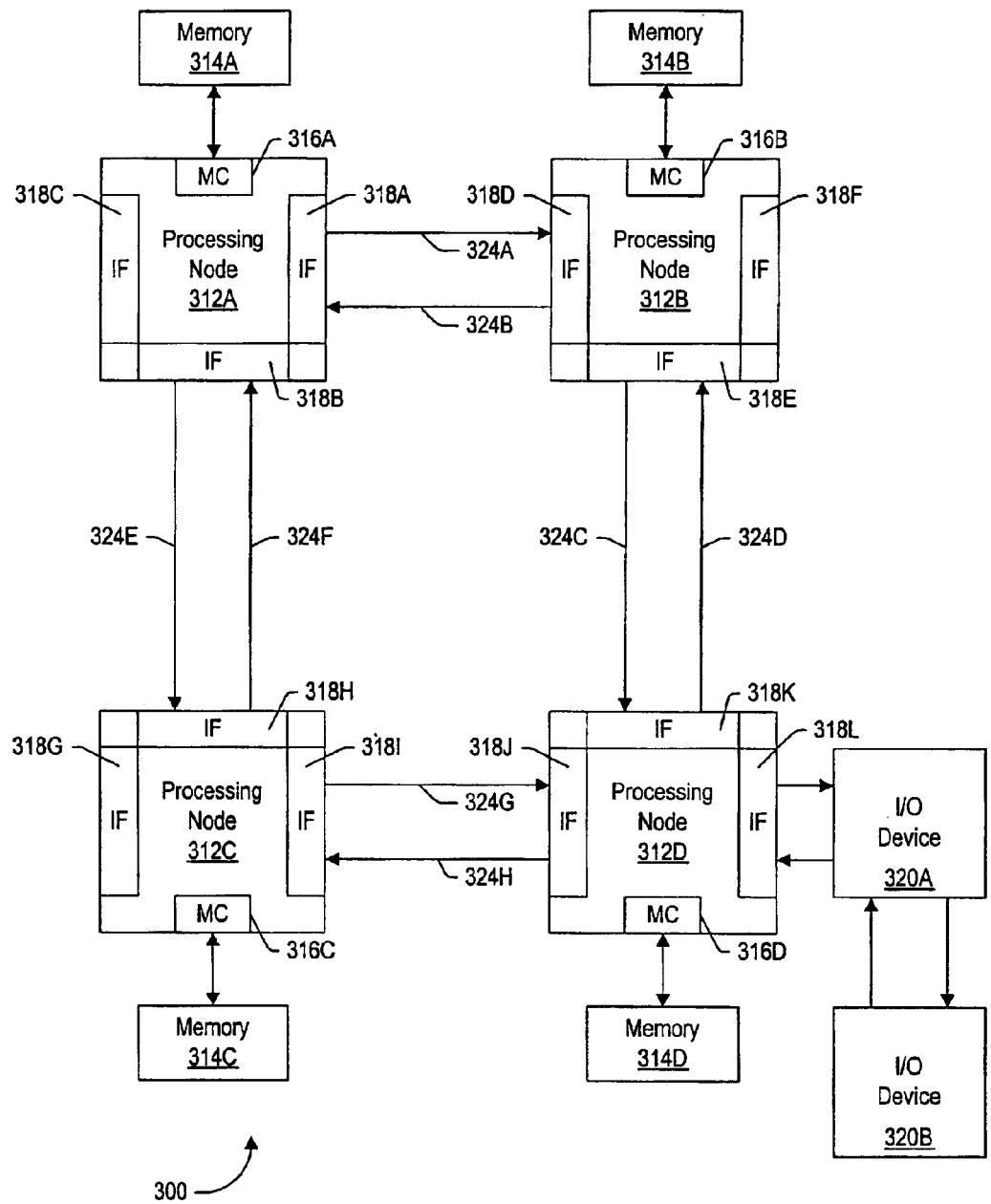
FIG. 17 is a block diagram of another embodiment of a computer system including the processor shown in FIG. 1.

Turning now to FIG. 17, another embodiment of a computer system 300 is shown. Other embodiments are possible and contemplated. In the embodiment of FIG. 17, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 17. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 17. Any suitable routing algorithm may be used. Other embodiments of computer system 300 may include more or fewer processing nodes then the embodiment shown in FIG. 17.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicate with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A processor comprising:
   a segment register configured to store a segment base address and a selector which, in at least one operating mode, locates a segment descriptor in a segment descriptor table in memory;
   a register configured to store an address; and
   an execution core coupled to the segment register and the register, wherein the execution core is configured, in response to a first instruction, to swap the segment base address in the segment register and the address in the register.

2. The processor as recited in claim 1 wherein the register is a special purpose register.

3. The processor as recited in claim 1 wherein the register is a model specific register.

4. The processor as recited in claim 1 wherein each of the segment base address and the address include greater than 32 bits.

5. The processor as recited in claim 4 wherein the execution core is coupled to receive an indication of an operating mode of the processor, and wherein the operating mode specifies a default address size, and wherein the execution core is configured to execute the first instruction if the default address size is greater than 32 bits.

6. The processor as recited in claim 5 wherein the execution core is configured to signal an exception if the default address size is not greater than 32 bits.

7. The processor as recited in claim 1 wherein the first instruction is privileged.

8. The processor as recited in claim 7 wherein the execution core is configured, responsive to one or more predefined instructions separate from the first instruction, to read or write the register, and wherein the one or more predefined instructions are also privileged.

9. The processor as recited in claim 8 wherein the execution core is configured, responsive to the one or more predefined instructions or the first instruction, to signal an exception if a privilege level of the processor is not sufficient for execution of the one or more predefined instructions or the first instruction.

10. An apparatus comprising:
    a first storage location corresponding to a segment register, the first storage location configured to store a segment base address and a selector which, in at least one operating mode, locates a segment descriptor in a segment descriptor table in memory;
    a second storage location corresponding to a register, the second storage location configured to store an address; and
    a processor coupled to the first storage location and to the second storage location, wherein the processor is configured, in response to a first instruction, to swap the segment base address in the first storage location and the address in the second storage location.

11. The apparatus as recited in claim 10 wherein the register is a special purpose register.

12. The apparatus as recited in claim 10 wherein the register is a model specific register.

13. The apparatus as recited in claim 10 wherein each of the segment base address and the address include greater than 32 bits.

14. The apparatus as recited in claim 13 wherein the processor, in response to an operating mode specifying a default address size, is configured to process the first instruction if the default address size is greater than 32 bits.

15. The apparatus as recited in claim 14 wherein the processor is configured to signal an exception if the default address size is not greater than 32 bits.

16. The apparatus as recited in claim 10 wherein the first instruction is privileged.

17. The apparatus as recited in claim 16 wherein the processor is configured, responsive to the first instruction, to signal an exception if a privilege level is not sufficient for execution of the first instruction.

18. A computer accessible storage medium storing an instruction which, when executed in a processor, causes a segment base address from a segment register and an address stored in a different register to be swapped, wherein the segment register is further configured to store a selector which, in at least one operating mode of the processor, locates a segment descriptor in a segment descriptor table in memory.

19. The computer accessible storage medium as recited in claim 18 wherein the different register is a special purpose register.

20. The computer accessible storage medium as recited in claim 18 wherein the different register is a model specific register.

21. The computer accessible storage medium as recited in claim 18 wherein the instruction is privileged and wherein the instruction, when executed, causes an exception if a privilege level of the executing processor is insufficient to execute the instruction.

22. The computer accessible storage medium as recited in claim 18 wherein each of the segment base address and the address include greater than 32 bits, and wherein the instruction, when executed, causes an exception if the operating mode of the executing processor does not specify an address size greater than 32 bits.

23. A computer accessible storage medium storing an operating system routine including a first instruction which, when executed in a processor, causes a segment base address from a segment register and a base address stored in a register to be swapped, wherein the base address stored in the register is a pointer to one or more operating system data structures, and wherein the segment register is further configured to store a selector which, in at least one operating mode of the processor, locates a segment descriptor in a segment descriptor table in memory.

24. The computer accessible storage medium as recited in claim 23 wherein the operating system routine further includes one or more instructions which, when executed, save a first stack pointer from a stack pointer register to one of the one or more operating system data structures.

25. The computer accessible storage medium as recited in claim 24 wherein the operating system routine further includes one or more instructions which, when executed, load a second stack pointer into the stack pointer register from the one or more operating system data structures, the second stack pointer indicating a stack used by the operating system routine.

26. The computer accessible storage medium as recited in claim 23 wherein the operating system routine includes one or more instructions which, when executed, perform an operating system service.

27. The computer accessible storage medium as recited in claim 26 wherein the operating system routine further includes a second instruction subsequent to the one or more instructions, the second instruction, when executed, causing a swap of the segment base address from the segment register and the base address stored in the register to be swapped, thereby restoring a state of the segment register and the register to the state prior to the execution of the first instruction.

28. The computer accessible storage medium as recited in claim 27 wherein the first instruction and the second instruction have the same binary coding.

29. The computer accessible storage medium as recited in claim 23 wherein the first instruction is an initial instruction of the operating system routine.

30. A computer accessible storage medium storing a plurality of instructions which, when executed in a processor responsive to a first instruction, cause a segment base address from a storage location corresponding to a segment register and an address stored in a different storage location corresponding to a different register to be swapped, wherein the storage location corresponding to the segment register is further configured to store a selector which, in at least one operating mode of the processor, locates a segment descriptor in a segment descriptor table in memory.

31. The computer accessible storage medium as recited in claim 30 wherein the plurality of instructions emulate the first instruction when executed.

32. The computer accessible storage medium as recited in claim 30 wherein the plurality of instructions are executed in place of the first instruction.

33. The computer accessible storage medium as recited in claim 30 wherein the first instruction is privileged and wherein the plurality of instructions, when executed, cause an exception if a privilege level is insufficient to execute the first instruction.

34. The computer accessible storage medium as recited in claim 30 wherein each of the segment base address and the address include greater than 32 bits, and wherein the plurality of instructions, when executed, cause an exception if the operating mode of the executing processor does not specify an address size greater than 32 bits.

* * * * *